United States Patent
Semnani et al.

(10) Patent No.: US 10,794,721 B2
(45) Date of Patent: Oct. 6, 2020

(54) REAL-TIME MAPPING USING GEOHASHING

(71) Applicant: Taymour Semnani, Salt Lake City, UT (US)

(72) Inventors: Taymour Semnani, Salt Lake City, UT (US); Kaveh Manizad, Houston, TX (US); Raul Geana, Timis County (RO); Gabriel Poamaneagra, Timis County (RO); Ileana Georgiu, Timis County (RO); Jay Melone, Asbury Park, NJ (US); John Vetan, New York, NY (US)

(73) Assignee: Taymour Semnani, Salt Lake City, UT (US)

( * ) Notice: Subject to any disclaimer, the term of this patent is extended or adjusted under 35 U.S.C. 154(b) by 146 days.

(21) Appl. No.: 15/441,046

(22) Filed: Feb. 23, 2017

(65) Prior Publication Data

US 2018/0017406 A1   Jan. 18, 2018

Related U.S. Application Data

(63) Continuation-in-part of application No. 15/224,308, filed on Jul. 29, 2016, now abandoned.

(60) Provisional application No. 62/361,989, filed on Jul. 13, 2016, provisional application No. 62/411,472, filed on Oct. 21, 2016, provisional application No. 62/452,237, filed on Jan. 30, 2017.

(51) Int. Cl.
*G01C 21/36*   (2006.01)
*G01C 21/34*   (2006.01)
*G01C 21/20*   (2006.01)

(52) U.S. Cl.
CPC ....... *G01C 21/3676* (2013.01); *G01C 21/206* (2013.01); *G01C 21/3438* (2013.01)

(58) Field of Classification Search
CPC ......... G06Q 10/00; G06Q 40/06; G06F 17/60
USPC ...................................................... 705/7.39
See application file for complete search history.

(56) References Cited

U.S. PATENT DOCUMENTS

| | | | |
|---|---|---|---|
| 6,415,427 B2 * | 7/2002 | Nitta | G06F 30/394 716/129 |
| 8,171,447 B1 * | 5/2012 | Balsdon | G06F 30/394 716/129 |
| 8,788,999 B1 * | 7/2014 | Baldsdon | G06F 30/394 716/126 |
| 8,977,748 B1 * | 3/2015 | Mendis | H04W 4/029 709/224 |
| 9,064,341 B2 * | 6/2015 | Hultquist | G01C 21/3667 |
| 9,247,062 B2 | 1/2016 | Fahlgren et al. | |

(Continued)

OTHER PUBLICATIONS

Maps Mania, "Geohashing with Google Maps", Dec. 2011, pp. 1-6 (Year: 2011).*

*Primary Examiner* — Romain Jeanty
(74) *Attorney, Agent, or Firm* — Patent Law Works, LLP

(57) ABSTRACT

Systems and methods for real-time mapping using geohashing are described. In an example implementation, a method includes receiving current location data from a first computing device in real-time, mapping the current location data in a map that includes collected location data from a second computing device, generating a heat map based on the current location data and the collected location data, determining a line using the generated heat map, and providing a route suggestion based on the determined line to the first computing device.

20 Claims, 18 Drawing Sheets

(56) References Cited

U.S. PATENT DOCUMENTS

| | | | |
|---|---|---|---|
| 9,336,681 B2 * | 5/2016 | Annapureddy | G01C 21/3453 |
| 9,699,603 B2 * | 7/2017 | Shen | H04W 24/02 |
| 9,794,373 B1 * | 10/2017 | Steinmetz | H04L 67/42 |
| 2014/0045517 A1 | 2/2014 | Marti et al. | |
| 2014/0163934 A1 | 6/2014 | Zhang et al. | |
| 2014/0358437 A1 * | 12/2014 | Fletcher | G01C 21/3617 |
| | | | 701/533 |
| 2015/0199653 A1 * | 7/2015 | Cili | G06Q 10/1095 |
| | | | 705/7.19 |
| 2015/0264523 A1 * | 9/2015 | Xu | H04W 4/021 |
| | | | 455/456.3 |

\* cited by examiner

REAL-TIME MAPPING USING GEOHASHING

CROSS-REFERENCE TO RELATED APPLICATIONS

The present application is a continuation-in-part of U.S. patent application Ser. No. 15/224,308, titled "Methods, Systems and Data Structures to Analyze and Improve Security Throughput in Real-Time", filed on Jul. 29, 2016, which claims the benefit under 35 U.S.C. § 119(e) of U.S. Provisional Patent Application Ser. No. 62/361,989, titled "Methods, Systems and Data Structures to Analyze and Improve Security Throughput in Real-Time", filed on Jul. 13, 2016, the entire contents of each of which are incorporated by reference. The present application also claims the benefit under 35 U.S.C. § 119(e) of U.S. Provisional Patent Application Ser. No. 62/411,472, titled "Methods, Systems and Data Structures to Analyze and Improve Security Throughput in Real-Time", filed on Oct. 21, 2016, the entire contents of which are incorporated herein by reference. The present application also claims the benefit under 35 U.S.C. § 119(e) of U.S. Provisional Patent Application Ser. No. 62/452,237, titled "Real-Time Mapping Using a Heat Map", filed on Jan. 30, 2017, the entire contents of which are incorporated herein by reference.

BACKGROUND

The present disclosure relates to collecting and analyzing location information and generating in real-time a geohash based on the analyzed location information.

Existing approaches to analyze location information incorporate map functions and GPS tracking. In one existing approach a user can enter information into a computing device related to an address relating to an end location. The map function can calculate a route based on the end address, the initial address, and a street map and provide the route to the user. The route may be based on a shortest distance, shortest time, or may allow a user to select from alternate routes. However, these routes are calculated based on the information stored in the map including the speeds on various streets and do not account for any real-time changes in the map information. For example, a user can enter and end location and the map function may provide an estimated time, however traffic along the route may be present and the estimated time will not be accurate as a result of the traffic in real-time.

In further existing approaches, a GPS tracking function is incorporated that tracks the user as the user moves along the route and updates the route based on the users movement. The GPS tracking function allows for updates to the route if a user deviates from a location and can update the estimated wait-time if a user is stuck in congestion and no longer moving. However, the GPS tracking does not account for real-time changes in the route from other users before the user is also in the congestion.

The existing approaches are not able to adjust the route based on real-time information.

SUMMARY

According to one innovative aspect of the subject matter in this disclosure, a method for real-time mapping using geohashing is described. In an example implementation, a method includes receiving current location data from a first computing device in real-time, mapping the location data in a map that includes collected location data from a second computing device, generating a heat map based on the current location data and the collected location data, determining a line using the generated heat map, and providing a route suggestion based on the determined line to the first computing device. In a further example implementation, the route suggestion may include an estimated wait-time based on the heat map. The estimated wait-time may indicate an estimated wait-time between a first point along the route suggestion and a second point along the route suggestion. Other implementations include corresponding computer systems, apparatus, and computer programs recorded on one or more computer storage devices, each configured to perform the actions of the methods.

Implementations may include one or more of the following features. The method where mapping the current location data in the map further includes determining that the current location data satisfies a threshold accuracy; and mapping the current location data in the map in response to the current location data satisfies the threshold accuracy. The method where mapping the current location data in the map further includes mapping the current location data into a geohash overlaying the map, the geohash including a plurality of grid sections. The method where determining the line using the heat map further includes: decoding a portion of the plurality of the grid sections into coordinate data; labeling one grid section of the plurality of the grid sections as a grid section of interest based on the coordinate data being associated with an area of interest; comparing a current timestamp associated with the current location data to a neighboring timestamp associated with previously collected location data in a neighboring grid section; determining that the neighboring timestamp of the neighboring grid section satisfies a threshold time period; and labeling the grid section of interest and the neighboring grid section as forming a portion of the line. The method where determining the line using the heat map further includes: determining a density of each of the grid sections, the density being related to a quantity of location points from separate computing devices collected over a time period; comparing the densities of each of the grid sections to densities of adjacent grid sections; and determining the line includes adjacent grid sections that include densities that satisfy a density threshold compared to neighboring grid sections. The method where the route suggestion is a wait-time for the determined line. The method where the wait-time is determined by comparing the densities of the grid sections of the line to historical data of similar densities of grid sections and estimated times to move through similar densities. The method where receiving the current location data from the first computing device further includes: detecting that the first computing device has entered a tracking area; and in response to detecting that the first computing device has entered the tracking area, receiving the current location data from the first computing device. The system where mapping the current location data in the map further includes determining that the current location data satisfies a threshold accuracy; and mapping the current location data in the map in response to the current location data satisfies the threshold accuracy. The system where mapping the current location data in the map further includes mapping the current location data into a geohash overlaying the map, the geohash including a plurality of grid sections. The system where determining the line using the heat map further includes: decoding a portion of the plurality of the grid sections into coordinate data; labeling one grid section of the plurality of the grid sections as a grid section of interest based on the coordinate data being associated with an area of interest; comparing a current timestamp associated with the current location data to a neighboring timestamp associated with previously collected location data in a neighboring grid section; determining that the neighboring timestamp of the neighboring grid section satisfies a threshold time period; and labeling the grid section of interest and the neighboring grid section as forming a portion of the line. The system where determining the line using the heat map further includes: determining a density of each of the grid sections, the density being related to a quantity of location points from separate computing devices collected over a time period; comparing the densities of each of the grid sections to densities of adjacent grid sections; and determining the line includes adjacent grid sections that include densities that satisfy a density threshold compared to neighboring grid sections. The system where the route suggestion is a wait-time for the determined line. The system where the wait-time is determined by comparing the densities of the grid sections of the line to historical data of similar densities of grid sections and estimated times to move through similar densities. The system where receiving the current location data from the first computing device further includes: detecting that the first computing device has entered a tracking area; and in response to detecting that the first computing device has entered the tracking area, receiving the current location data from the first computing device. The method further including determining a route through the tracking area based on the line. The method where determining the route through the tracking area based on the line further includes identifying a bottleneck where a density of location points satisfies a bottleneck threshold; and identifying a throughput where a density of location point indicates a flow. The method where clustering the location points further includes aggregating the location points in each of the grid sections; and assigning a density value to each of the grid sections based on the aggregated location points.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
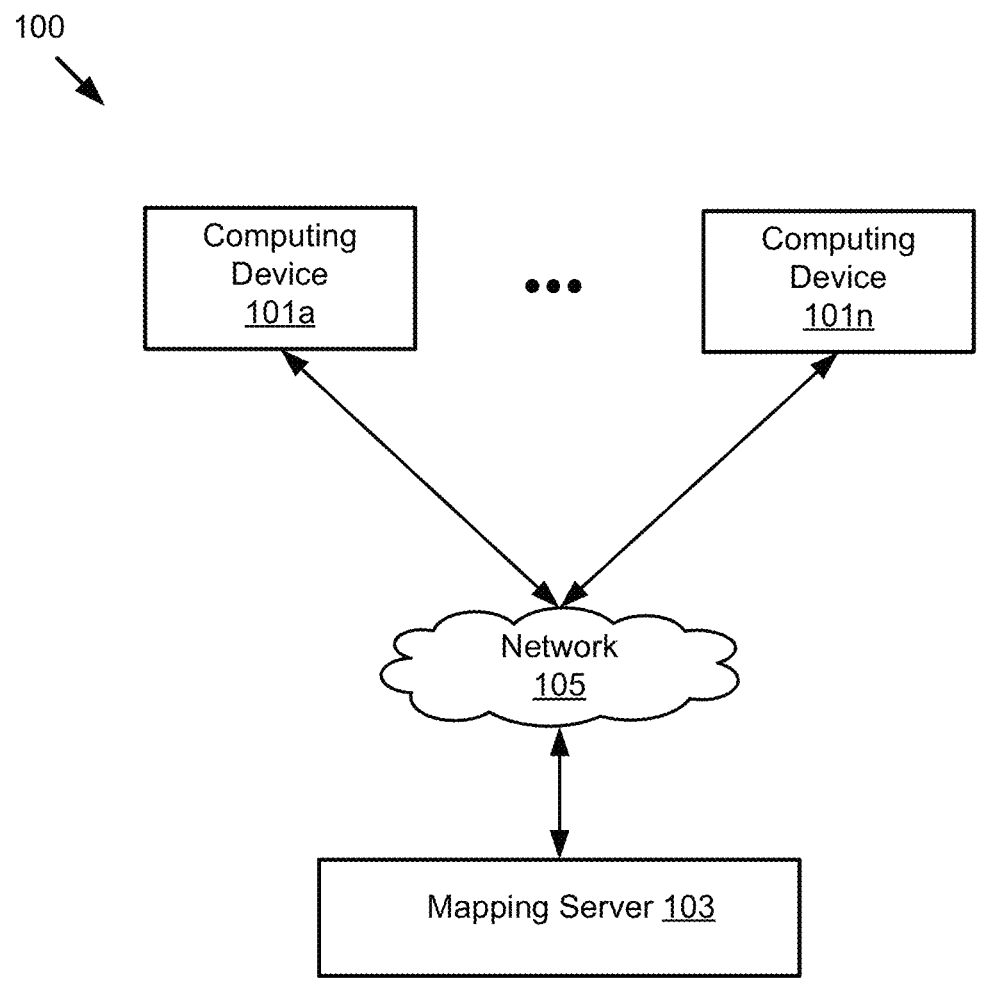
FIG. 1 is a block diagram illustrating an example computer system for real-time mapping using geohashing.

The technology described herein provides systems and methods for real-time mapping using geohashing. In addition to the described technology, other technologies are also described and contemplated herein. FIG. 1 is a block diagram illustrating an example computer system 100 for real-time mapping using a heat map. With reference to FIG. 1, a user may be using a computing device 101a connected to a mapping server 103 via a network 105. As the user moves through an area, the mapping server 103 may receive location data related to a location point of the computing device 101a and map the location. In further implementations, the mapping server 103 may receive location data collected from other computing devices 101n in real-time and also map that location data. The mapping server 103 may generate a heat map using all of the location data that represents a location of one of or all of the computing devices 101 in real-time. The mapping server 103 may analyze the heat map to make location determinations based on the flow of the location data and changes in the location data in real-time, such as locations of bottlenecks and throughputs of users. In some implementations, the location determinations may include location of crowds, flow and/or movement of users through the map, routes and/or throughputs a user may use to navigate to different positions, estimated wait-times between two points, closures or access points, alternate routes, etc. By performing geohashing in real-time, the mapping server 103 may provide real-time guidance and updates to a user on how long a wait-time will be, an alternate route to a location, and many other useful determinations that can provide the user with information in real-time of events happening in an area.

In one implementation, the geohashing may be used to provide estimated wait-times to a specific computing device 101. The estimated wait-time may use a heat map and a density of location points at a specific moment in real-time to estimate the time it would take for a user to move through an area from a first point to a second point. The estimated wait-time may be updated in real-time as the flow of location data changes over time and is tracked by the mapping server 103. In some implementations, the estimated wait-time may be auto-generated based on high-density areas of the heat map. In further implementations, the estimated wait-time may be determined based on a first location and a second location being input by a user of the computing device 101 and the mapping server 103 determines throughput.

The computing device 101 included in the example configuration 100 may be used by a user. Example computing devices 101 may include, but are not limited to, mobile phones (e.g., feature phones, smart phones, etc.), tablets, laptops, desktops, netbooks, media streaming devices, portable media players, navigation devices, personal digital assistants, etc.

The computing devices 101a . . . 101n (also referred to individually and collectively as 101) are computing devices having data processing and communication capabilities. For instance, a computing device 101 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.), and/or geolocation sensors. The computing devices 101a . . . 101n may couple to and communicate with one another and the other entities of the system 100 via the network 105 using a wireless and/or wired connection. While two or more computing devices 101 are depicted in FIG. 1, the system 100 may include any number of computing devices 101. In addition, the computing devices 101a . . . 101n may be the same or different types of computing devices.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the device 101 and the mapping server 103, in practice one or more networks 105 can be connected to these entities.

In some implementations, the system 100 includes a mapping server 103 coupled to the network 105. In some implementations, the mapping server 103 may be either a hardware server, a software server, or a combination of software and hardware. The mapping server 103 may be, or may be implemented by, a computing device including a processor, a memory, applications, a database, and network communication capabilities. In the example of FIG. 1, the components of the mapping server 103 are configured to implement a mapping application 310 described in more detail below. In one implementation, the mapping server 103 provides location determinations to a user of a computing device 101.

In some implementations, the mapping server 103 sends and receives data to and from other entities of the system 100 via the network 105. For example, the mapping server 103 receives location data from the computing device 101 and sends location determinations to the computing device 101. In further implementations, mapping server 103 may send information to the computing device 101 that the computing device 101 can use to display the location determinations in a graphical user interface. Although only a single mapping server 103 is shown in FIG. 1, it should be understood that there may be any number of mapping servers 103 or a server cluster.

Figure 2:
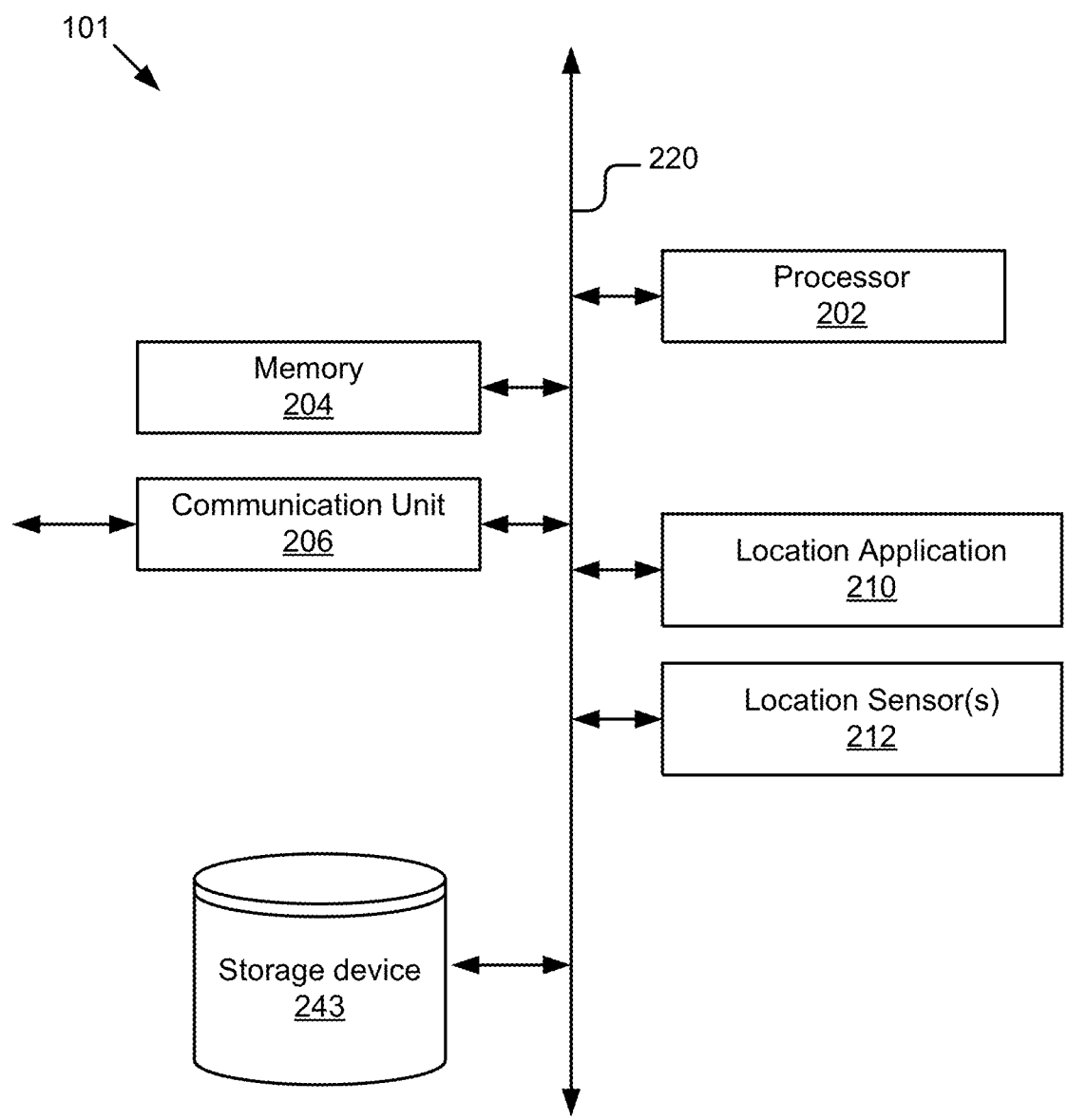
FIG. 2 is a block diagram illustrating an example computing device.

FIG. 2 is a block diagram illustrating an example computing device 101. As depicted, the computing device 101 may include a processor 202, memory 204, communication unit 206, location application 210, location sensor(s) 212, and a storage device 243 which are communicatively coupled by a communications bus 220. However, it should be understood that the computing device 101 is not limited to such and may include other elements, including, for example, a display (not shown) and/or an input device (not shown).

The processor 202 may execute software instructions by performing various input/output, logical, and/or mathematical operations. The processor 202 has various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores.

The memory 204 is a non-transitory computer-readable medium that is configured to store and provide access to data to the other elements of the computing device 101. In some implementations, the memory 204 may store instructions and/or data that may be executed by the processor 202. For example, the memory 204 may store the location application 210. The memory 204 is also capable of storing other instructions and data, including, for example, an operating system, hardware drivers, other software applications, data, etc. The memory 204 may be coupled to the bus 220 for communication with the processor 202 and the other elements of the computing device 101.

The communication unit 206 may include one or more interface devices (I/F) for wired and/or wireless connectivity with the network 105 and/or other devices. In some implementations, the communication unit 206 may include transceivers for sending and receiving wireless signals. For instance, the communication unit 206 may include radio transceivers for communication with the network 105 and for communication with nearby devices using close-proximity (e.g., Bluetooth®, NFC, etc.) connectivity. In some implementations, the communication unit 206 may include ports for wired connectivity with other devices. For example, the communication unit 206 may include a CAT-5 interface, Thunderbolt™ interface, FireWire™ interface, USB interface, etc.

In some implementations, the computing device 101 may include a display (not shown) that may display electronic images and data output by the computing device 101 for presentation to a user. The display may include any conventional display device, monitor or screen, including, for example, an organic light-emitting diode (OLED) display, a liquid crystal display (LCD), etc. In some implementations, the display may be a touch-screen display capable of receiving input from one or more fingers of a user. For example, the display may be a capacitive touch-screen display capable of detecting and interpreting multiple points of contact with the display surface. In some implementations, the computing device 101 may include a graphics adapter (not shown) for rendering and outputting the images and data for presentation on display. The graphics adapter (not shown) may be a separate processing device including a separate processor and memory (not shown) or may be integrated with the processor 202 and memory 204.

In some implementations, the computing device 101 may include an input device (not shown) that may include any device for inputting information into the computing device 101. In some implementations, the input device may include one or more peripheral devices. For example, the input device may include a keyboard (e.g., a QWERTY keyboard), a pointing device (e.g., a mouse or touchpad), microphone, a camera, etc. In some implementations, the input device may include a touch-screen display capable of receiving input from the one or more fingers of the user. For instance, the functionality of the input device and the display may be integrated, and a user of the computing device 101 may interact with the computing device 101 by contacting a surface of the display using one or more fingers. In this example, the user could interact with an emulated (i.e., virtual or soft) keyboard displayed on the touch-screen display by using fingers to contact the display in the keyboard regions.

The location application 210 may include software and/or logic for processing location data received from the location sensor(s) 212. In some implementations, the location application 210 may process the location data and determine which location data 210 is being requested by the mapping server 103. In further implementations, the location application 210 may follow a schedule or request for when to submit location data via the communication unit 206 to the mapping server 103. In further implementations, the location application 210 may detect that a location is within a tracking area and begin sending location data to the mapping server 103. In some implementations, the location application 210 may be configured to generate a graphical user interface for display on the display screen.

The location sensor(s) 212 may include sensing device(s) that are capable of detecting a location and/or environment of the computing device 101. Non-limiting example sensing device(s) include a geolocation sensor(s) (e.g., GPS transceivers, Bluetooth transceivers, Global Navigational Satellite System (GLONASS) transceivers, ultra-wideband sensor, radio-positioning sensor, Real-time Location System (RTLS) sensor, RFID sensor, radio beacons, ultrasound identification, ultrasonic ranging, wide-over-narrow band, wireless local network location, etc.) accelerometer, gyroscope, proximity sensor, etc. Other types of sensors are also contemplated. The location sensor(s) 212 may be configured to provide coordinate data to the location application 210.

The storage device 243 is an information source for storing and providing access to stored data, such as a database of maps, historical location data, user profile information, object data, location sensor(s) 212, calibration data, and/or any other information generated, stored, and/or retrieved by the location application 210.

In some implementations, the storage device 243 may be included in the memory 204 or another storage device coupled to the bus 220. In some implementations, the storage device 243 may be or included in a distributed data store, such as a cloud-based computing and/or data storage system. In some implementations, the storage device 243 may include a database management system (DBMS). For example, the DBMS could be a structured query language (SQL) DBMS. For instance, storage device 243 may store data in an object-based data store or multi-dimensional tables comprised of rows and columns, and may manipulate, i.e., insert, query, update, and/or delete, data entries stored in a verification data store using programmatic operations (e.g., SQL queries and statements or a similar database manipulation library). Additional characteristics, structure, acts, and functionality of the storage device 243 is discussed elsewhere herein.

Figure 3:
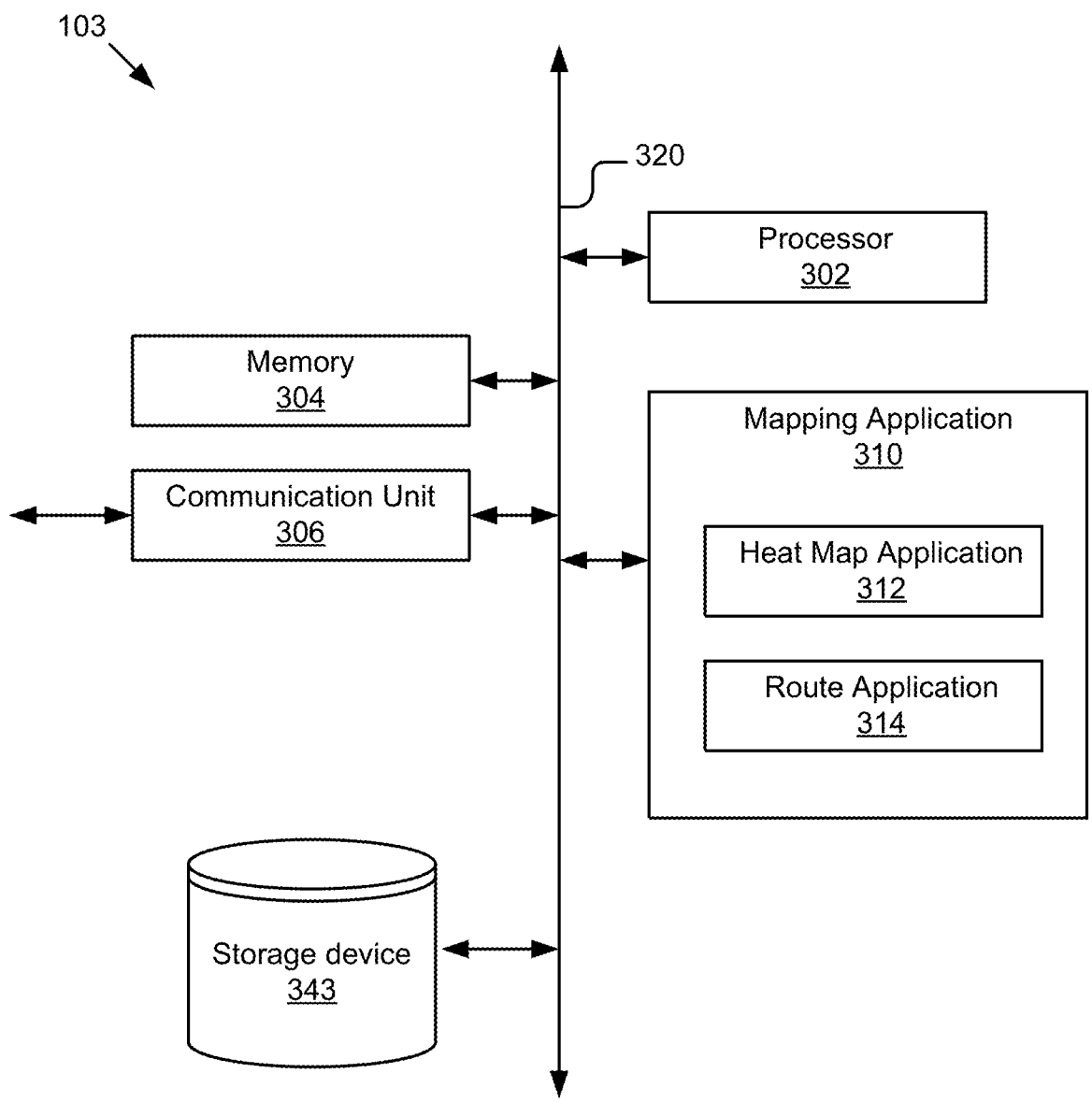
FIG. 3 is a block diagram illustrating an example mapping server.

FIG. 3 is a block diagram illustrating an example mapping server 103. As depicted, the mapping server 103 may include a processor 302, memory 304, communication unit 306, mapping application 310, and a storage device 343 which are communicatively coupled by a communications bus 320.

The processor 302 may execute software instructions by performing various input/output, logical, and/or mathematical operations. The processor 302 has various computing architectures to process data signals including, for example, a complex instruction set computer (CISC) architecture, a reduced instruction set computer (RISC) architecture, and/or an architecture implementing a combination of instruction sets. The processor 302 may be physical and/or virtual, and may include a single core or plurality of processing units and/or cores.

The memory 304 is a non-transitory computer-readable medium that is configured to store and provide access to data to the other elements of the mapping server 103. In some implementations, the memory 304 may store instructions and/or data that may be executed by the processor 302. For example, the memory 304 may store the mapping application 310. The memory 304 is also capable of storing other instructions and data, including, for example, an operating system, hardware drivers, other software applications, data, etc. The memory 304 may be coupled to the bus 320 for communication with the processor 302 and the other elements of the mapping server 103.

The communication unit 306 may include one or more interface devices (I/F) for wired and/or wireless connectivity with the network 206 and/or other devices. In some implementations, the communication unit 105 may include transceivers for sending and receiving wireless signals. For instance, the communication unit 306 may include radio transceivers for communication with the network 105 and for communication with nearby devices using close-proximity (e.g., Bluetooth®, NFC, etc.) connectivity. In some implementations, the communication unit 306 may include ports for wired connectivity with other devices. For example, the communication unit 306 may include a CAT-5 interface, Thunderbolt™ interface, FireWire™ interface, USB interface, etc.

The storage device 343 is an information source for storing and providing access to stored data, such as a database of maps, historical location data, user profile information, object data, location sensor(s) 212 calibration data, and/or any other information generated, stored, and/or retrieved by the mapping application 310.

In some implementations, the storage device 343 may be included in the memory 304 or another storage device coupled to the bus 320. In some implementations, the storage device 343 may be or included in a distributed data store, such as a cloud-based computing and/or data storage system. In some implementations, the storage device 343 may include a database management system (DBMS). For example, the DBMS could be a structured query language (SQL) DBMS. For instance, storage device 343 may store data in an object-based data store or multi-dimensional tables comprised of rows and columns, and may manipulate, i.e., insert, query, update, and/or delete, data entries stored in a verification data store using programmatic operations (e.g., SQL queries and statements or a similar database manipulation library). Additional characteristics, structure, acts, and functionality of the storage device 343 is discussed elsewhere herein.

The mapping application 310 may include software and/or logic for receiving location points, generating a geohash of the location points, and analyzing the densities for various determinations. The mapping application 310 may include a heat map application 312 and a route application 314. The elements 312 and 314 may be communicatively coupled by the bus 320 and/or the processor 302 to one another and/or the other elements 304, 306, and/or 343 of the mapping server 103. In some implementations, one or more of the elements 312 and 314 are sets of instructions executable by the processor 302 to provide their functionality. In some implementations, one or more of the elements 312 and 314 are stored in the memory 304 of the mapping server 103 and are accessible and executable by the processor 302 to provide their functionality. In any of the foregoing implementations, these components 312, and 314 may be adapted for cooperation and communication with the processor 302 and other elements of the mapping server 103.

The heat map application 312 includes software and/or logic for processing the location data and generating a heat map. In some implementations, the heat map application 312 may plot location data related to one or more computing devices 101 in real-time (or substantially real-time, meaning the time it takes to receive real-time notifications, process the notifications, and display the updated data) on a grid that overlays a graphical depiction of a map. In some implantations, the heat map application 312 may generate visualizations to represent density of location data at specific points in the heat map. The heat map application 312 may be coupled to the storage device 343 via the bus 320 to store, retrieve, and otherwise manipulate data stored therein.

The route application 314 includes software and/or logic for analyzing the heat map and/or the geohash and making location determinations. The route application 314 may be coupled to the heat map application 312 via the processor 302 and/or the bus 320 to receive the heat map. The route application 314 may use standard and/or complex algorithms to compare the heat map, the geohash, and/or other historic data at a location and make location determinations. In further implementations, the route application 314 may employ machine-learning algorithms to make location determinations. For example, the route application 314 may analyze the heat map and/or the geohash and determine that a position that historically has been mapped to include users moving through the position currently does not have any users moving through the position. The route application 314 may use that determination along with another determination that users are moving through nearby positions as expected based on the historically data to make the location determination that the position is currently closed in real-time. In further implementations, the route application 314 may make location determinations that include wait-times as described elsewhere herein.

Figure 4:
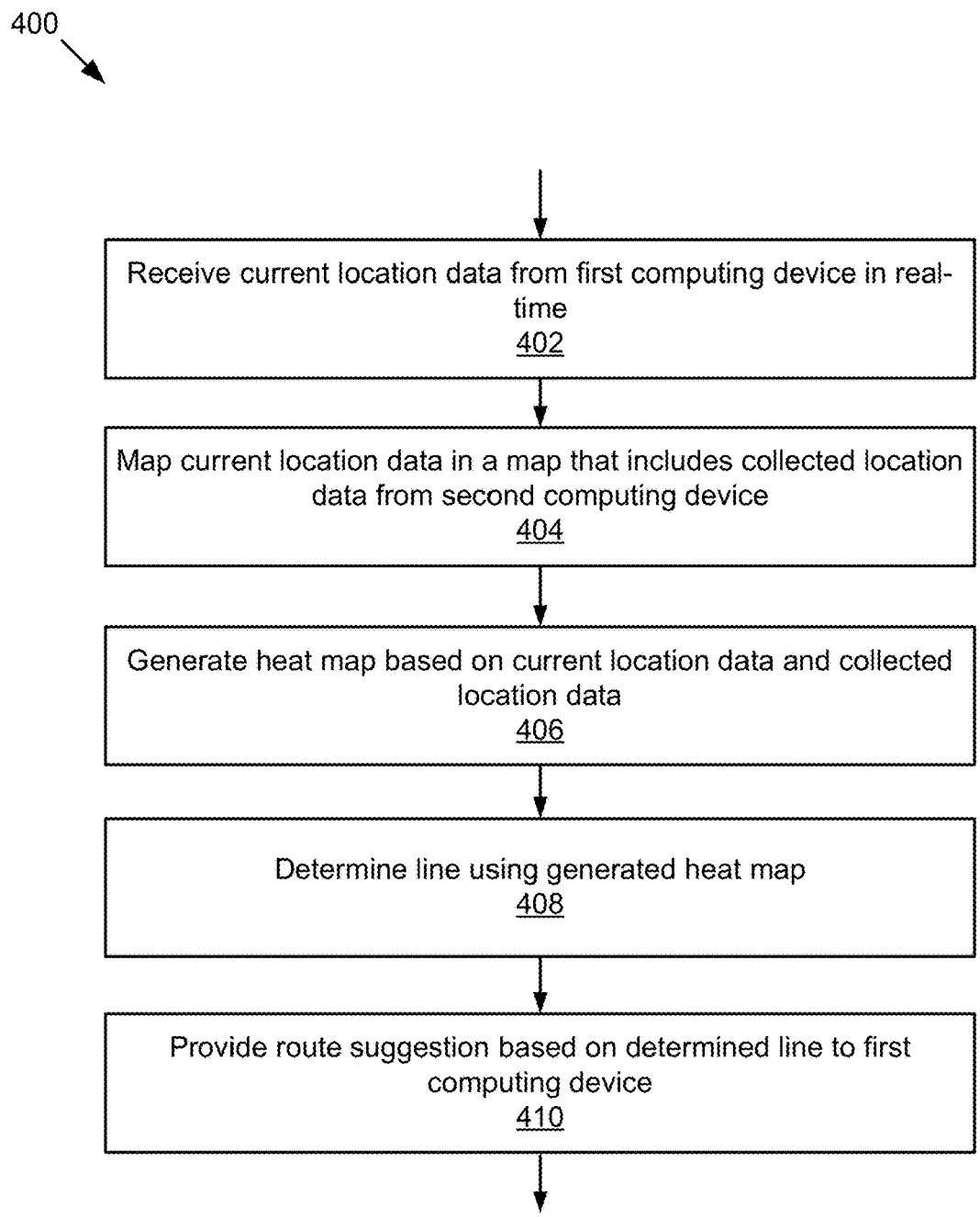
FIG. 4 is a flowchart of an example method for real-time mapping using a heat map.

FIG. 4 is a flowchart of an example method 400 for real-time mapping using a heat map. At 402, the mapping application 310 receives current location data from the first computing device 101*a* in real-time. In some implementations, the mapping application 310 receives the current location data from the first computing device 101*a* by receiving the location data from an application running (in the foreground or background) of the first computing device 101*a*. The application may trigger based on a proximity to a specific location (e.g., tracking area, etc.) and begin sending out location data based on that trigger. In further implementations, the application may trigger based on a request for an estimated wait-time from a user of the computing device 101. For example, a user may designate that they are heading to an airport and when the first computing device 101*a* is near the airport, as determined by the location application 210, the first computing device 101*a* may begin sending location data to the mapping application 310. The location data may be sent in time increments, or may be continuously updated.

At 404, the mapping application 310 maps the current location data in a map that includes collected location data from a second computing device 101*b*. In some implementations, the map may be a map retrieved from a third party application by the mapping application 310. In further implementations, the map may be generated by the mapping application based on data and models. In further implementations, the map may be created and stored in the storage device 343 and accessed by the mapping application 310. In some implementations, the mapping application 310 may overlay the current location data in the map in a grid form over various axis. In some implementations, the map may be a two-dimensional map, while in further implementations, the map may include three or more dimensions. The collected location data may include location data pulled from one or more other computing devices 101 at the same and/or a different time as the current location data.

In some implementations, the map may also include other location data collected at different times. For example, the map could include location data from other computing devices 101 collected at the same time on a previous day. In another, example, the map may only include the locations of the specific computing device 101 collected at different times to display the progress over time of the computing device 101 through an area.

At 406, the heat map application 312 generates a heat map based on the current location data and collected location data. In some implementations, the heat map is a visual indication of the density of location data at a specific point. In further implementations, the heat map can indicate areas where more location data indicates that computing devices 101 are located. For example, if a user is going to an airport, the heat map may show clusters of location data where users are waiting in a line, such as a security checkpoint. In some implementations, the heat map may be generated by overlaying the visualization onto the map. In further implementations, the heat map may be generated by creating a new map with heat map visualizations. The heat map may include other information beyond the density of location data, including a time of the location data, etc.

At 408, the route application 314 may determine a line using the generated heat map. In some implementations, the route application may use techniques to compare the current heat map to historical data and identify points where location data indicates that computing devices 101 appear to be moving through an area of the map indicating a line. In further implementations, the route application 314 may mark location determinations by analyzing the location data and the density of location data at specific points on the heat map. For example, the route application 314 may use the location data and/or historical data to determine that a portal (e.g., access point, doorway, entrance, etc.) on the map is open and/or closed. In further implementations, the route application 314 may analyze a geohash as described elsewhere herein to determine the line. In some implementations, a line may be defined as a grid section that satisfies a density threshold and the density threshold may be programmed or identified using machine learning. The route application 314 may be able to identify points on the heat map where location data indicates computing devices 101 are moving, stagnant, being diverted from historical flows, etc.

In further implementations, the route application 314 may be able to determine real-time estimated wait-times based on the location data and the heat map. For example, the route application 314 may be able to identify trends in the historical data related to how long specific computing devices 101 took to log location data between two points. The route application 314 may compare the historical data to the real-time heat map and determine real-time trends related to an estimated time for how long a computing device 101 indicated at a first specific location point will take to move to a second specific location point using the current density of location data between the first point and the second point. In some implementations, the estimated wait-times may be determined for high-density portions of the heat map. In further implementations, the estimated wait-times may be based on a specific route or travel itinerary of a user. In some implementations, the estimated wait-times may update in real-time as the heat map changes (e.g., as the flow of location data moves along the map, the wait-times will update over various areas where the heat map indicates changing areas of congestion.)

It will be appreciated that a sample size of overall data points can be used to represent these location determinations. For example, not every computing device 101 in an area needs to be sending location data to the mapping server 103 in order for location determinations to be made. Over time and as models are tracked and analyzed, relatively small, consistent sample sizes of location data can be used to make location determinations. In further implementations, machine learning and predictive modeling can be used to further make the location determinations using the real-time and/or historic location data.

At 410, the route application 314 provides a route suggestion based on the determined route to the location application 210 of the first computing device 101. The route suggestion may be a suggested route to a specific location on the map. The route suggestions may be an estimated wait-time at a point, an indication that a route is closed and/or open, etc. The route suggestion may be based on an estimated time, a density of computing devices 101 in an area, an open and/or closed route, a wait-time from an beginning point to an ending point, etc. For example, a user may be traveling through an airport and the route application 314 may send to the computing device 101 of the user a notification that the security checkpoint line at a first terminal is longer than a security checkpoint line at a second terminal and suggest that the user go to the second terminal security checkpoint.

The route application 314 may include a series of rules to make the route suggestion determinations. The rules may be preprogrammed, set by a user, developed over time using machine learning, etc. For example, the rules may set a preference for the overall amount of time it would take to move from a first point to a second point, rather than an overall distance between the first point and the second point. In further implementations, the location application 210 of the computing device 101 may provide real-time updates and/or notification as suggested routes change based on real-time data collected at various locations on the heat map. For example, a user may be traveling in a car and an accident may happen along the suggested route. The route application 314 may identify the greater density and slower movement of computing devices 101 located near the site of the crash and may update the suggested route in real-time to avoid the congestion caused by the crash.

Figure 5:
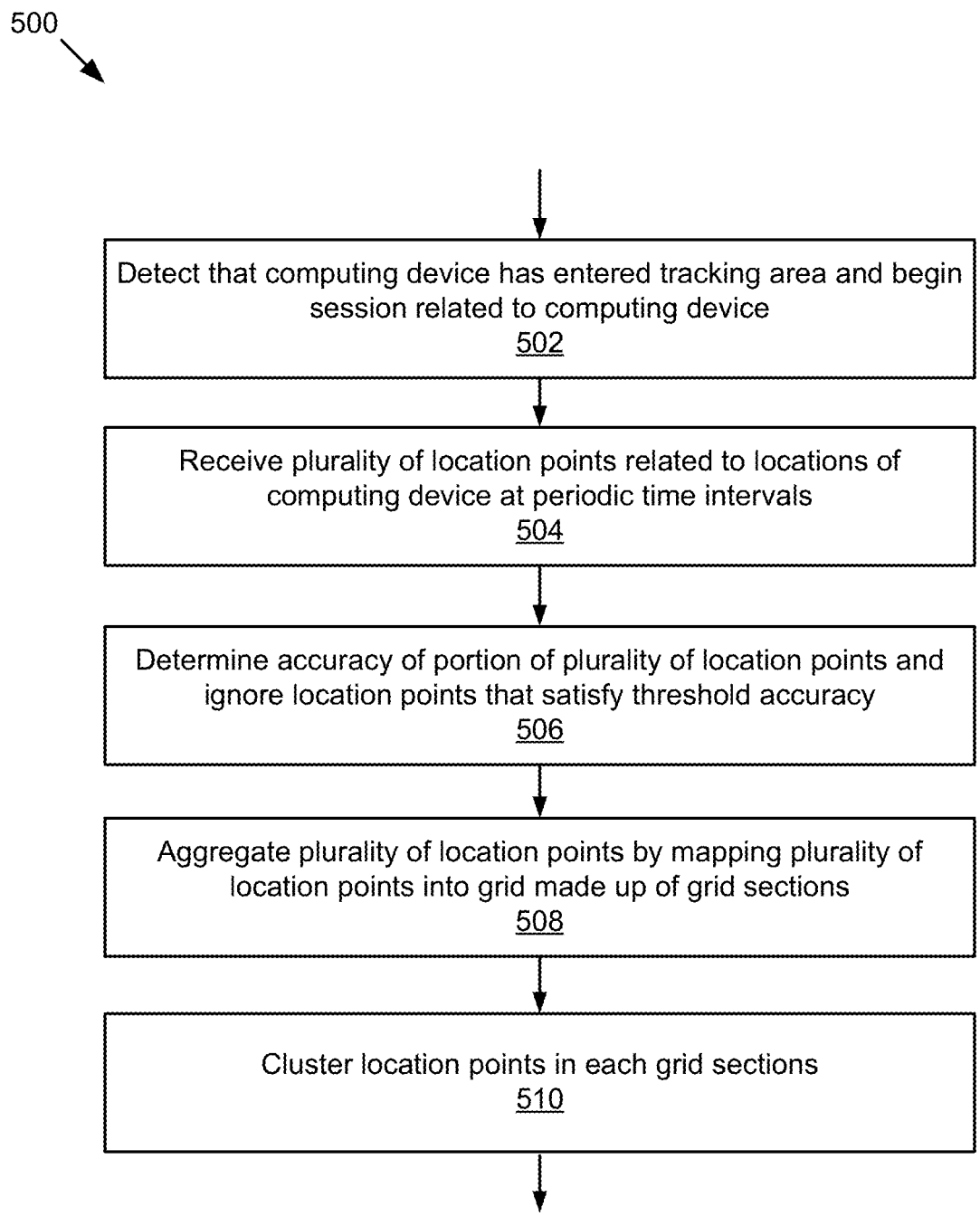
FIG. 5 is a flowchart of an example method for generating a geohash.

FIG. 5 is a flowchart of an example method 500 for generating a geohash. At 502, the mapping application 310 may detect that a computing device 101 has entered a tracking area and begin a session related to the computing device 101. The tracking area may be a circular area based on a radius of a predefined distance from a center point. For example, the center point may be a point inside of building of interest, such as an airport terminal, and the radius may be a distance outside of that airport terminal that encompasses the area based on the area of interest. The tracking area allows the computing device 101 to only send location data in situations where the mapping application 310 is interested in receiving location data to map various computing devices 101. This allows users of computing devices 101 to opt into having location data sent to the mapping application 310. In further implementations, the location data may be collected from computing devices 101 outside of the tracking area, based on a user's preferences and approvals. In further implementations, the tracking area may be a shape other than a circular area, such as a rectangle, or a preprogrammed area around the area of interest, etc.

The mapping application 310 begins a session to capture and store the specific location data received from the computing device 101 related to the time that the computing device 101 is in the tracking area. For example, the mapping application 310 may store the location data received in a database within a storage device such as storage device 343. As location data is received from the computing device 101, the mapping application 310 stores the location data, along with timestamps, and other data of interest to allow for later retrieval and review of the location data related to the specific computing device 101 of the session. Session data may be aggregated with other sessions of other computing devices 101 at a same or similar time period to generate real-time analytics of the various computing devices 101 in the area of interest.

At 504, the mapping application 310 may receive a plurality of location points related to locations of the computing device 101 at periodic time intervals. The computing device 101 may passively detect using various location sensor(s) 212 that the computing device 101 is within the tracking area and passively (in the background) determine locations of the computing device 101 at time intervals and sending the locations points (e.g., the coordinate data, etc.) of the computing device 101 at the various locations over time. The location points may be sent as location data to the mapping server 103 based on previously accessing and opting into sending location data to the mapping server 103 within various tracking areas. In one example, the computing device 101 may determine and send location points to the mapping server 103 every second, while in further implementations, other period time intervals are contemplated, such as every ten seconds, every thirty seconds, every minute, etc. As described above, the location points are saved by the mapping application 310 as location data within a session.

At 506, the mapping application 310 may determine an accuracy of at least a portion of the plurality of location points and ignore location points that satisfy a threshold accuracy. The accuracy may be determined by comparing location points to the tracking area and determining if points are outside of the tracking area. In further implementations, the mapping application 310 may apply a series of specific rules to the location points to determine accuracy. For example, the mapping application 310 may compare points within a time segment and based on a rule of movement determine that it is unlikely that a computing device 101 moved from a first point to a second point within a specific time period. For example, if a computing device 101 sends a first location point within a terminal and a second location point ten seconds later is outside of the terminal and 500 feet away, the mapping application 310 may ignore that second location point. To further the example, if the third location point that is received twenty seconds after the first location point is only ten feet away from the first location point, then the mapping application 310 may ignore the second location point as being an outlier that is disqualified under the specific rules. In further implementations, the mapping application 310 may use machine learning to determine and incorporate specific rules and algorithms as location points are received and ignored to further improve the accuracy.

At 508, the mapping application 310 may aggregate the remaining plurality of location points by mapping the plurality of location points into a grid made up of grid sections to form a geohash. As shown in FIG. 9, a geohash of the tracking area may be created out of grid sections. The geohash may be a series of grids. The grids may be squares, rectangles, or have other shapes that create grid sections, such as hexagons, octagons, etc. The geohash includes mapping the location points into grid sections and then determining how many location points are mapped into each grid section. At 510, the determining may be performed by clustering each of the location points in each of the grid sections. For example, a first grid section may have six location points related to various computing devices 101 at a specific time while a second grid section may have one location point at a specific time. This allows a geohash to show which grids received location points from different computing devices 101 at a points in time. In an alternate implementation, the geohash may be mapped over time and depict location points of a specific computing device 101 to track a movement of the computing device 101 through an area of interest. In this example, the geohash grids may show a density of location points within different grids and may be used to determine lines, routes, wait-times, etc. related to the specific computing device 101.

The geohash may be analyzed by the mapping application 310 to determine in substantially real-time how the location data is changing as it bottlenecks and identify throughputs. For example, a bottleneck may be defined as an area where a density of location points exceeds a density threshold, signifying that a large quantity of users are present in that location. Alternatively, a throughput may be defined as a location where a density of location points is below a density threshold and where users appear to be moving. In some implementations, a throughput may be compared to historical data to determine if the throughput is recent or historically users have moved through the throughput. Furthermore, using a geohash allows data to be more quickly processed to allow for more data points to be analyzed and location points to be sampled in smaller time increments to achieve greater accuracy.

Figure 6:
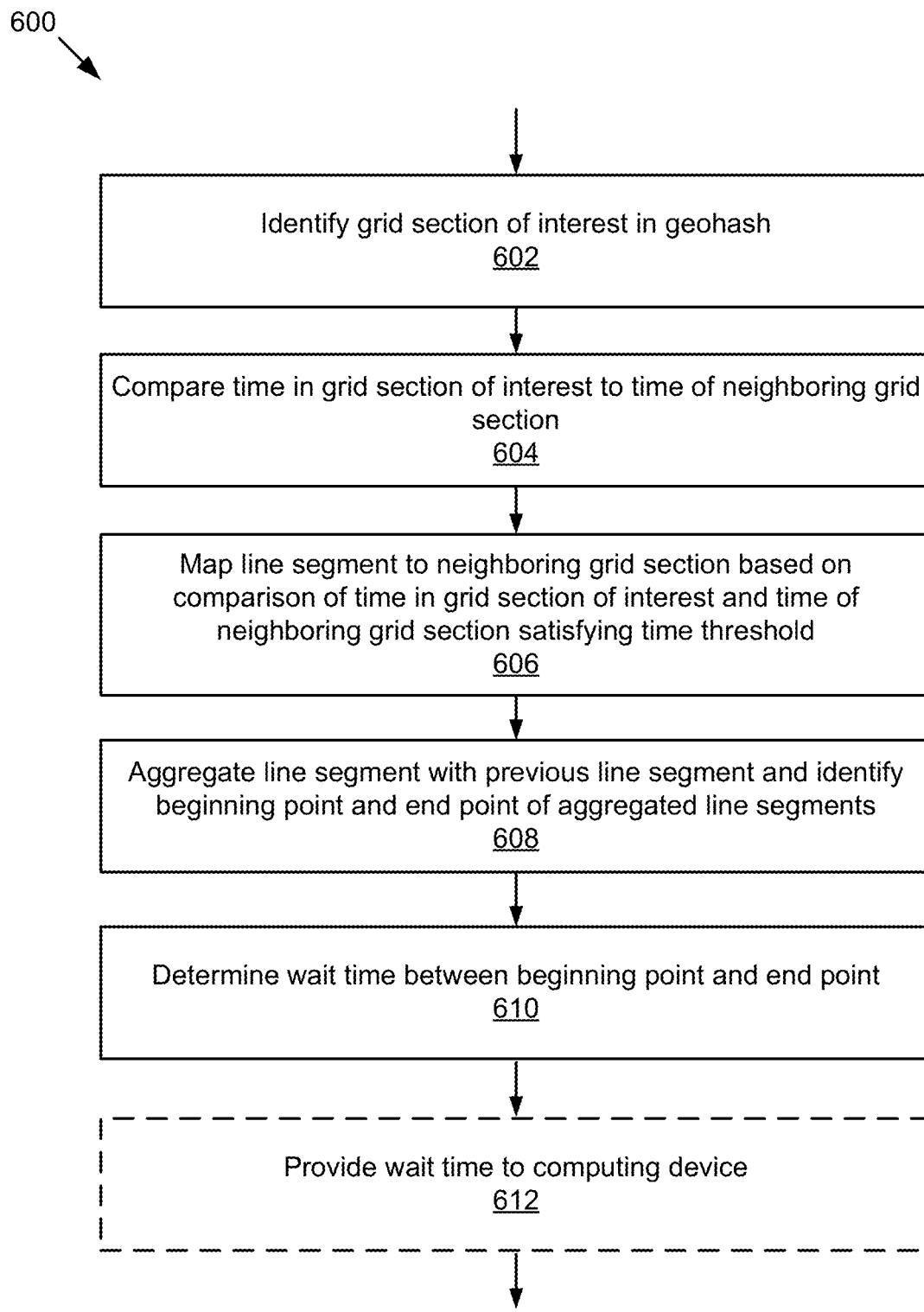
FIG. 6 is a flowchart of an example method for determining a wait-time.

FIG. 6 is a flowchart of an example method 600 for determining a wait-time. At 602, the mapping application 310 may identify a grid section of interest in the geohash (e.g., the mapped location data). The grid section of interest may be a previously identified location point. For example, the grid section of interest may be identified by analyzing the map and identifying a point on the map that corresponds to a location of interest in the corresponding area. For example, if the map depicts an airport, the location of interest may be a beginning point of a security checkpoint, a flight provider desk, a baggage claim area, a specific terminal, a restaurant, etc. The location of interest data may be programmed into the map and the geohash may indicate the grid section of interest as the one that includes the location of interest. In some implementations, the grid section of interest may be decoded into coordinate data for comparison with the location data. In further implementations, the mapping application 310 may identify the grid section of interest as the grid section with a highest density of location points within the grid. In further implementations, the mapping application 310 may then compare the grid section of interest to the map of the area and identify if locations of interest exist within that corresponding section of the map. For example, the grid section of interest may include a high density of location points and the corresponding map may show that this is the starting point of a security checkpoint.

At 604, the mapping application 310 may compare a time, related to a location point, spent in a grid section of interest to a time, related to a location point, spent in a neighboring grid section. By analyzing the times spend at various grids, the mapping application 310 may begin to determine routes of specific computing devices 101 by linking grid sections. For example, the mapping application 310 may identify a computing device 101 that sent location data within the grid section of interest. The mapping application 310 may then access neighboring grid sections and using the session data of the computing device 101 may determine which neighboring grid sections the computing device 101 sent location points from. The mapping application 310 may then compare each of those location point times to the location point time in the grid section of interest and identify the time difference between the grid section of interest and the neighboring grid section.

At 606, the mapping application 310 may map a line segment to neighboring grid sections based on the comparison of times in the grid section of interest and times of the neighboring grid sections satisfying a time threshold. The time threshold may be a preprogrammed time based on how long a computing device 101 that is in a line will move from one grid section to another grid section. For example, if the grid sections are six feet by six feet, a user moving in a line may move from a first grid section to a second grid section in fifteen seconds. If the time threshold in this example was thirty seconds, then the location points of the user moving from one grid section to another grid section would be counted because it's lower than the time threshold. Alternatively, if the user where to come back into the area an hour later, that location point would exceed and therefore not satisfy the time threshold and would not be mapped as part of the line. In further implementations, various time thresholds are contemplated based on the sizes of the grid sections and the speeds of the computing devices 101 that are of interest for line determinations. Furthermore, satisfying the time threshold may be exceeding or being lower than the time threshold, depending on how the time threshold is defined.

In further implementations, the line threshold may be an upper bound and a lower threshold that has to be exceeded to map a line may also exist. For example, a computing device moving unobstructed (not in a line) may pass from grid section to grid section at a specific speed, (such as every 10 seconds for an example.) So the lower bound may be used to ignore points of 10 seconds or less, such that only location points between grids where the computing device 101 is moving but not at the speed of a computing device 101 that is unobstructed are mapped into the line. This is advantageous as it allows for outlying location data to be ignored in real-time. For example, if the line being identified as a security checkpoint, then location points related to security personal, pre-check travelers, and/or other users not in the line but in the area and are sending out location points, then these outliers can be ignored for line determination purposes. This allows for the time threshold to be calibrated for different circumstances on the mapping server 103 side and the mapping application 310 can adjust the time threshold using preprogrammed and/or machine learning rules and algorithms as location data is received.

At 608, the mapping application 310 may then aggregate the line segment with previous line segments and identify a beginning point and an end point of the aggregated line segments. The aggregated line segments may form a mapped line that spreads across one or more grid sections based on comparing each grid section of the line segments to neighboring grid sections and identifying the grid sections that satisfy the time threshold and then repeating the process for the next section of the line. The mapping location 310 may identify the beginning point of the mapped line by identifying the grid section that includes location points received at the earliest time. In further examples, the mapping location 310 may analyze the mapped line and determine a beginning point based on the direction of the line, where the line connected, and/or the earliest location data, or a combination of these methods. The mapping location 310 may similarly identify the end point of the mapped line by identifying a location point received most recently, or the latest location point received in the line, etc.

At 610, the mapping application 310 may determine a wait-time between the beginning point and the end point of the mapped line. The mapping application 310 may determine the wait-time by identifying the difference between the time at the beginning point and the time at the end point. In some implementations, the mapping application 310 may provide a wait-time for a single computing device 101. In further implementations, the mapping application 310 may aggregate wait-times for various computing devices 101 with similar mapped lines and determine an average wait-time based on the aggregated data. The mapping application 310 may further perform additional analytics to identify information such as the real-time trend in average wait-time (is it going up or down), wait-times compared to historical data of the location at various times to determine when shortest wait-times exist, or areas to avoid over specific time periods and/or dates, etc. At 612, the mapping application 310 may provide the wait-time to the computing device 101 as described elsewhere herein.

Figure 7:
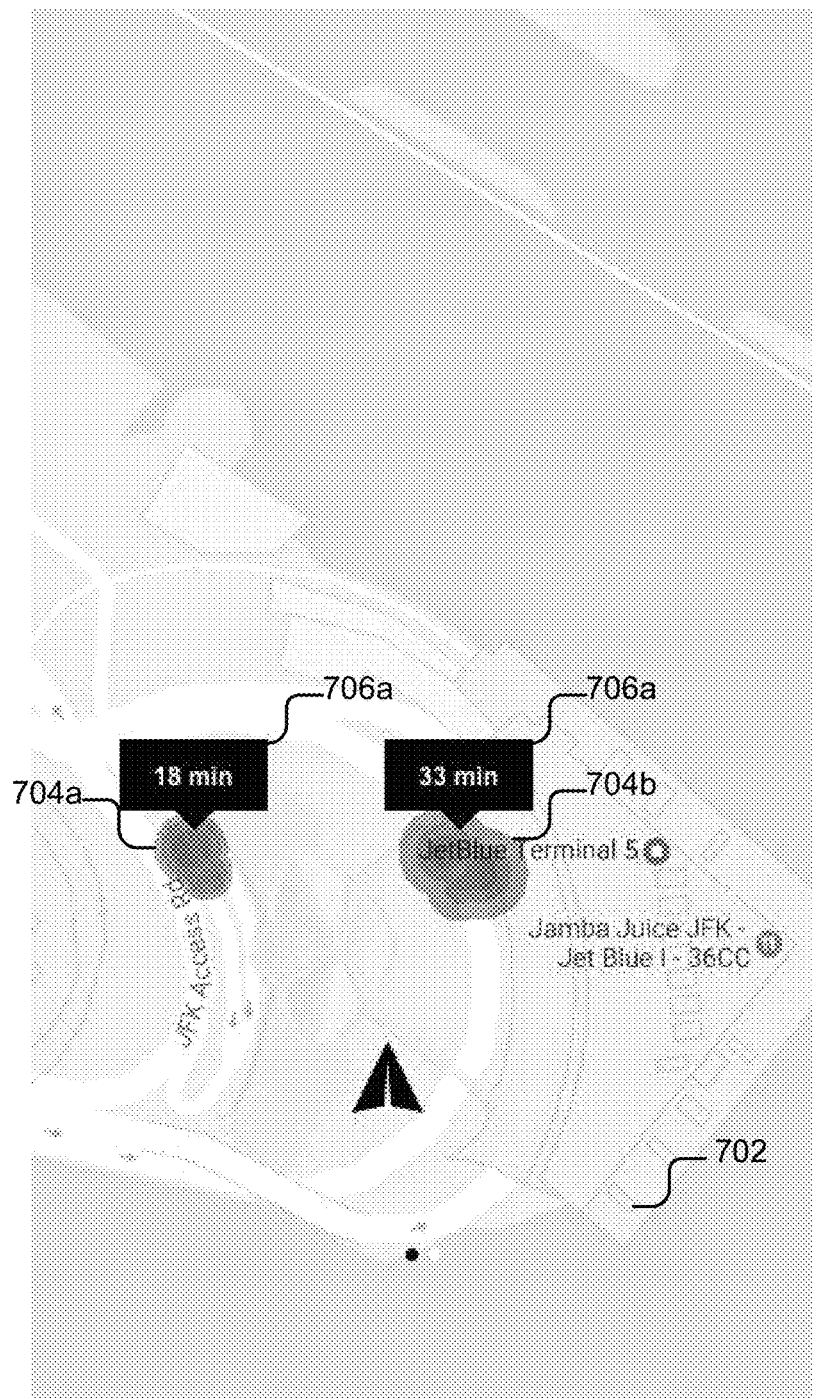
FIG. 7 is a graphical representation of an example heat map.

FIG. 7 is a graphical representation 700 of an example heat map. In some implementations, this example heat map may appear in a graphical user interface on a display of the computing device 101. The example heat map may include a map 702 depicting features, such as buildings, roads, environment, shops, services, vehicles, etc. In this example, the map 702 depicts an overhead view of an airport terminal building. Heat maps 704 may be generated on the map 702 indicating areas of the map where location data of computing devices 101 appear in greater densities. In this example, the heat maps 704 show in different color shades the density of location data at specific points in the map 702. The heat maps 704 may convey the density information in colors, shades, values, visualization, etc. The heat maps 704 may be overlaid or accessible in different ways by a user. In this implementation, the heat maps 704 include estimated wait-time indicators 706 for each of the heat maps 704a and 704b.

The estimated wait-time indicators 706 may receive their values from the route application 314 as described elsewhere herein.

Figure 8:
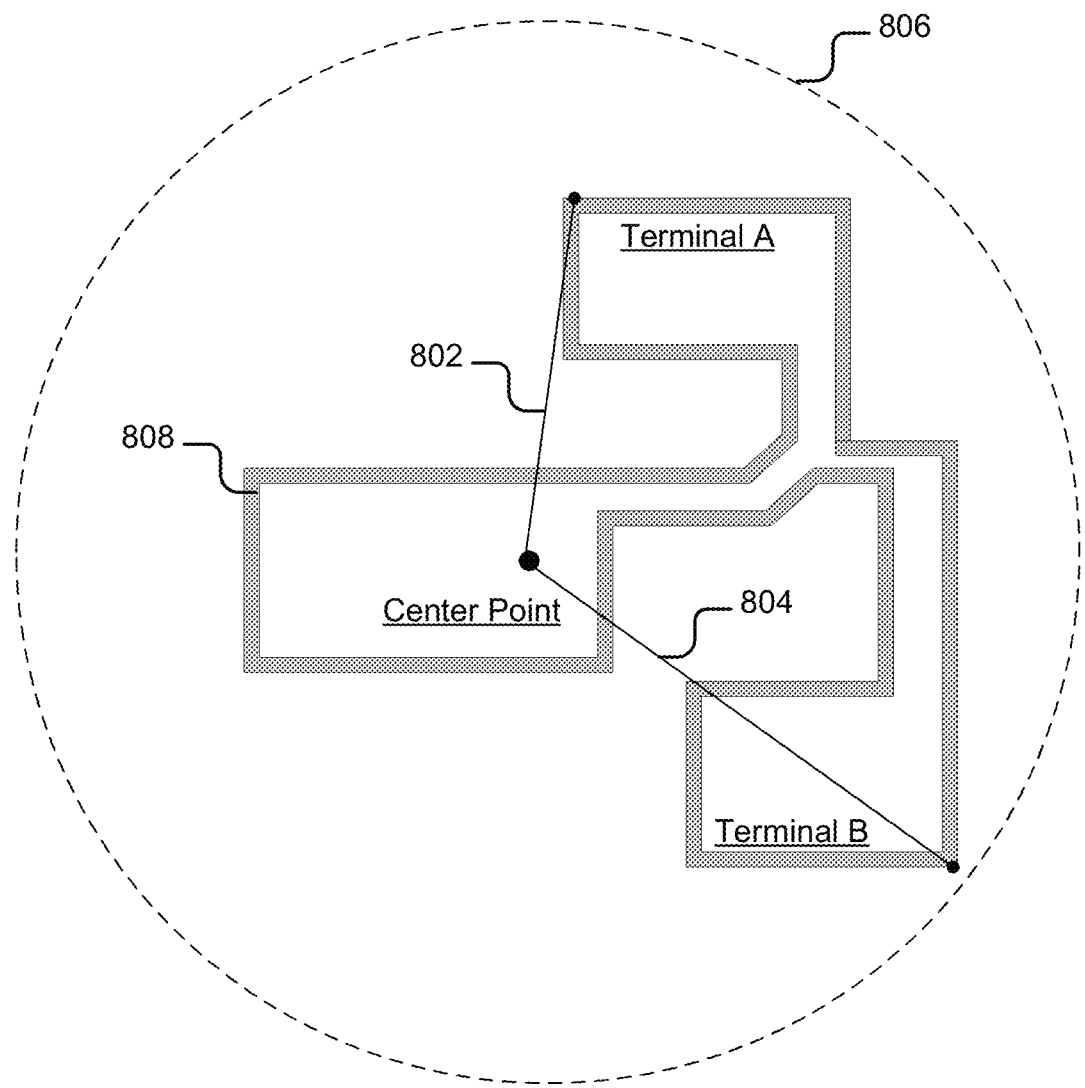
FIG. 8 is graphical representation of a tracking area.

FIG. 8 is an graphical representation of a tracking area 806. In this example, the tracking area includes a center point, terminal A, and terminal B of a building 808. The building 808 may be any building that is determined to be a location where collection of location points from computing devices 101 may occur. Building 808 may in alternative implementations be an area that does not include buildings, etc. Center point is a point of interest within building 808. In some implementations, the center point may be a center point of the building 808. The mapping application 310 may receive programming information, or may alternatively determine automatically points that represent the outer bounds of the building 808. For example, the outermost edges of terminal A and terminal B. Distance lines 802 and 804 represent the distances from center point to the outer bounds of terminal A and terminal B. The mapping location 310 may then determine which distance line (802 or 804) is greater and use that distance line (802 or 804) to create a radius. In this example, distance line 804 is longer and the mapping application 310 may create a radius based on the value of the distance line 804 plus some additional distance (for example fifty meters, etc.) The mapping application may then create a circular tracking area 806 using the radius. When a computing device 101 enters the tracking area 806, the computing device 101 may begin sending location points to the mapping server 103 based on the privacy settings of the computing device 101.

Figure 9A:
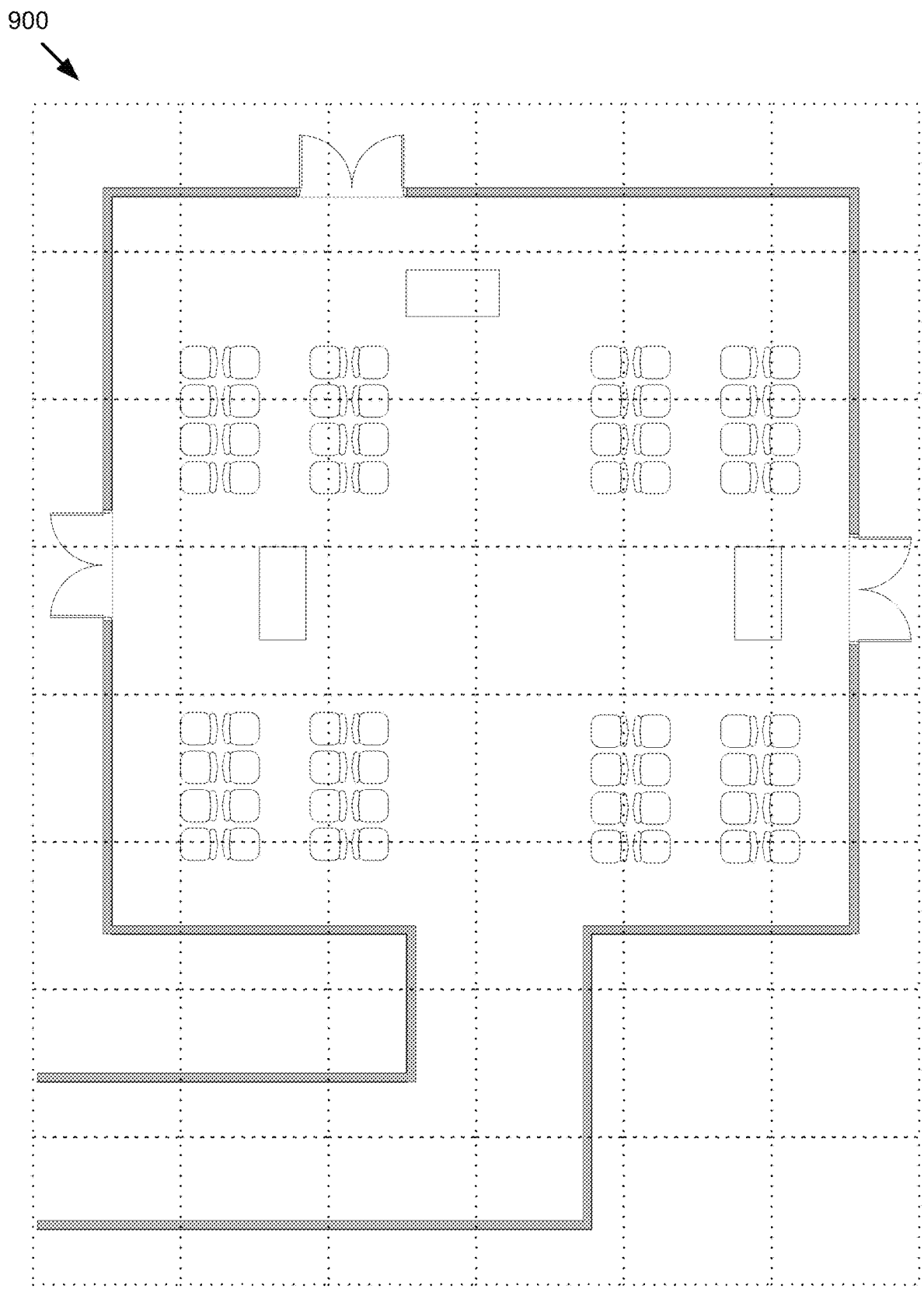
FIGS. 9A-9D are graphical representations of performing geohashing to determine a line.

FIG. 9A is a graphical representation of a geohash 900 on a mapping area. The geohash is represented by the dotted line grids that overlay the mapping area depicted in solid lines. In further implementations, the geohash may be any size and shape and may cover all of or only a portion of the mapping area. In this example, the mapping area depicted in solid lines depicts a room with seats and doors or a hallway on each side of the mapping area. FIG. 9A depicts the geohash of the mapping area before location data is mapped to each grid section.

Figure 9B:
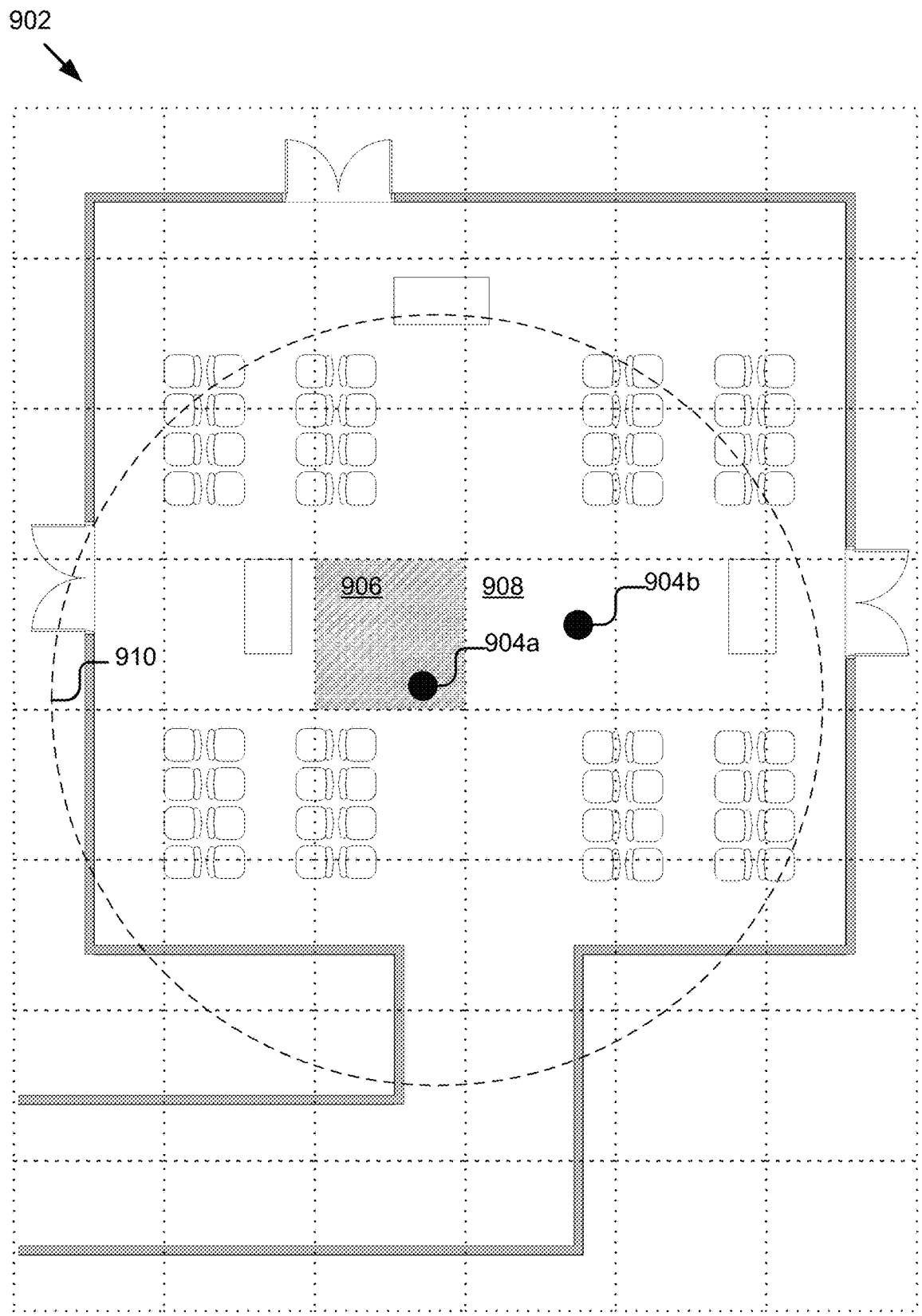

FIG. 9B is a graphical representation of a geohash 902 with location points 904 mapped into the grid sections. Grid section 906 is identified as the grid section of interest as described elsewhere herein. The location point 904a has been mapped into the grid section of interest 906. The grid section of interest 906 has been highlighted to indicate a difference and a formation of a line segment. Location point 904b is mapped to neighboring grid section 908 which is adjacent to the grid section of interest 906. The location points 904 may be mapped into the geohash by the mapping application 310 using location coordinate data, etc. Tracking area 910 may be represented by the circular area shown and may be included in some geohashes.

Figure 9C:
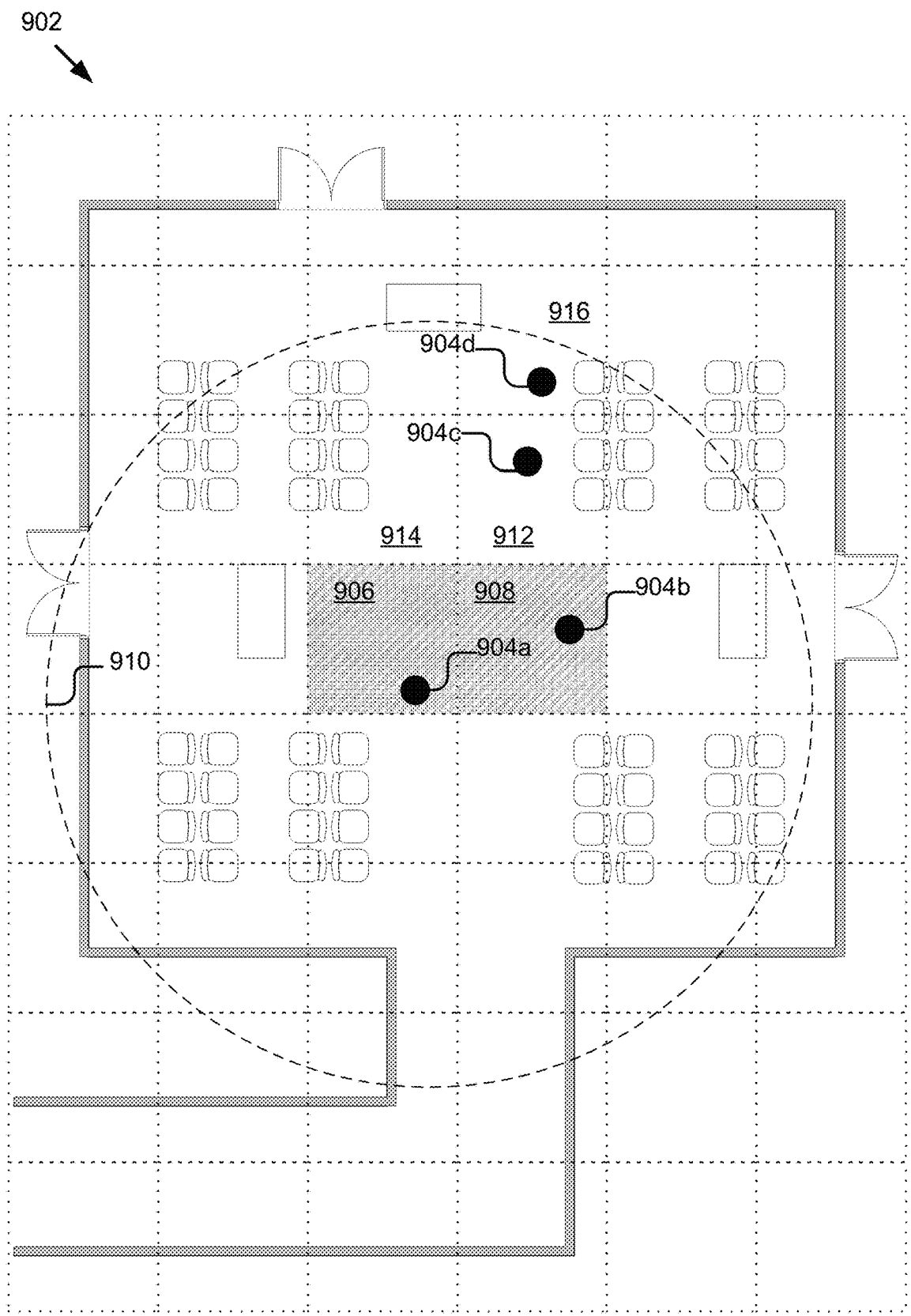

FIG. 9C is a graphical representation of geohash 902 with additional location points 904 mapped into the grid sections. Location points 904c and 904d are mapped to neighboring grid section 912 and grid section 916 respectively. The mapping application 310 may compare location points 904a and 904b to determine that the timestamps related to the location points 904a and 904b are below a time threshold and that grid section 908 is part of the line segment as shown by the highlighting of grid section 908. The mapping application 310 may analyze grid section 914 and determine that no location points 904 are present in grid section 914.

Figure 9D:
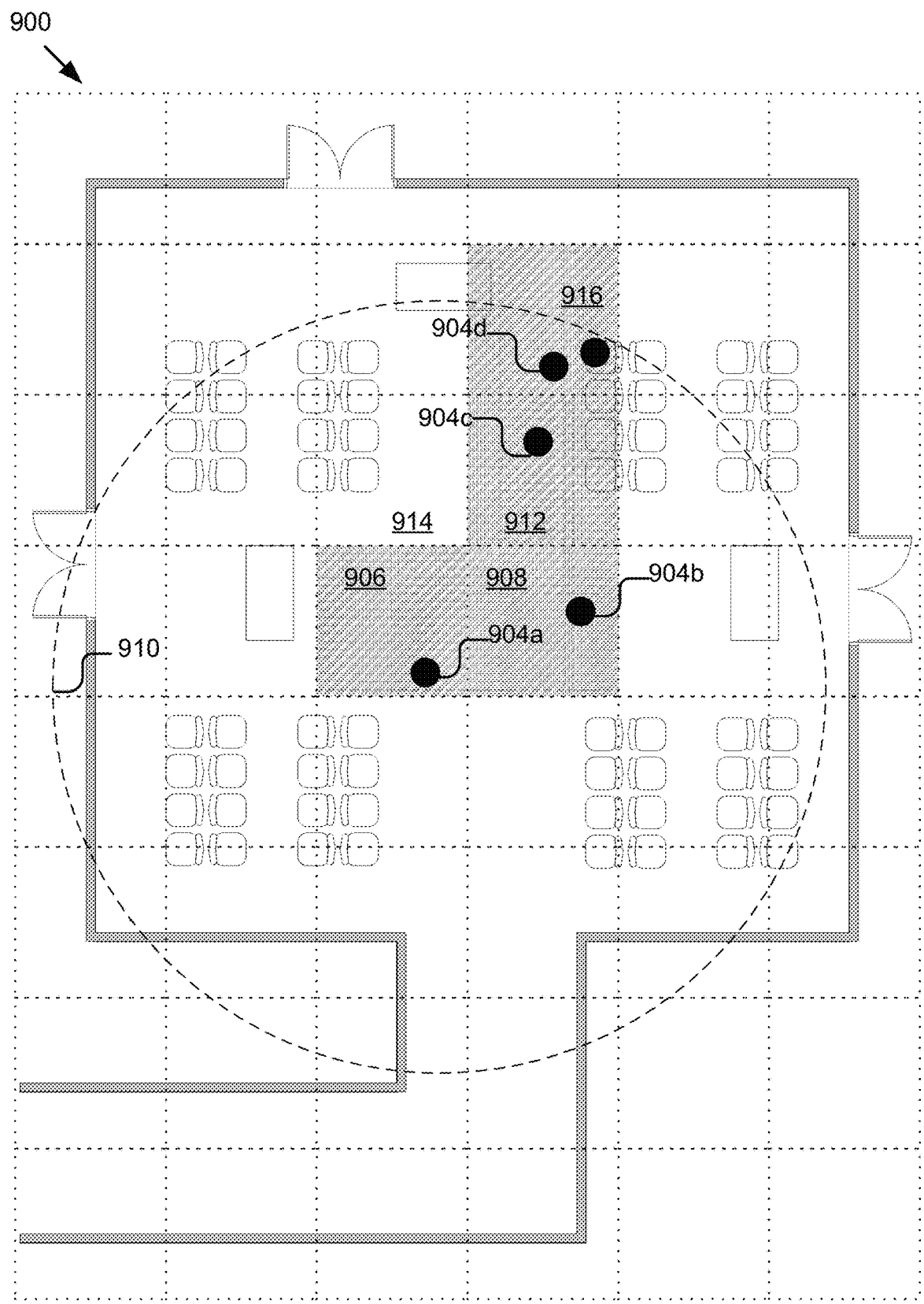

FIG. 9D is a graphical representation of geohash 902 depicting a mapped line including line segments. The mapping application 310 may compare location points 904a and 904c to determine that the timestamps for the location points 904a and 904c are below the threshold time and grid section 912 is part of the mapped line as indicated by the highlighting of grid section 912. The mapping application 310 may repeat the process of comparing grid sections to neighboring grid sections to further identify the mapped line. For example, the mapping application 310 may compare the timestamps of location point 904c to location point 904d in grid section 906. Based on the determination that the timestamps of 904c and 904d are below the time threshold, the mapping application 310 may highlight grid section 916 as an additional portion of the mapped line. By building this mapped line, the mapping application 310 may identify grid sections of the geohash that indicate lines in real-time and provide that information to computing devices 101. The mapping application 310 using nothing but timestamps and location data may be able to determine in real-time (based on the receipt of the most current location point) where computing devices 101 are clustered and moving slowly through an area, indicating a line and/or bottleneck, or area where computing devices 101 may have to wait for a period of time.

Figure 10:
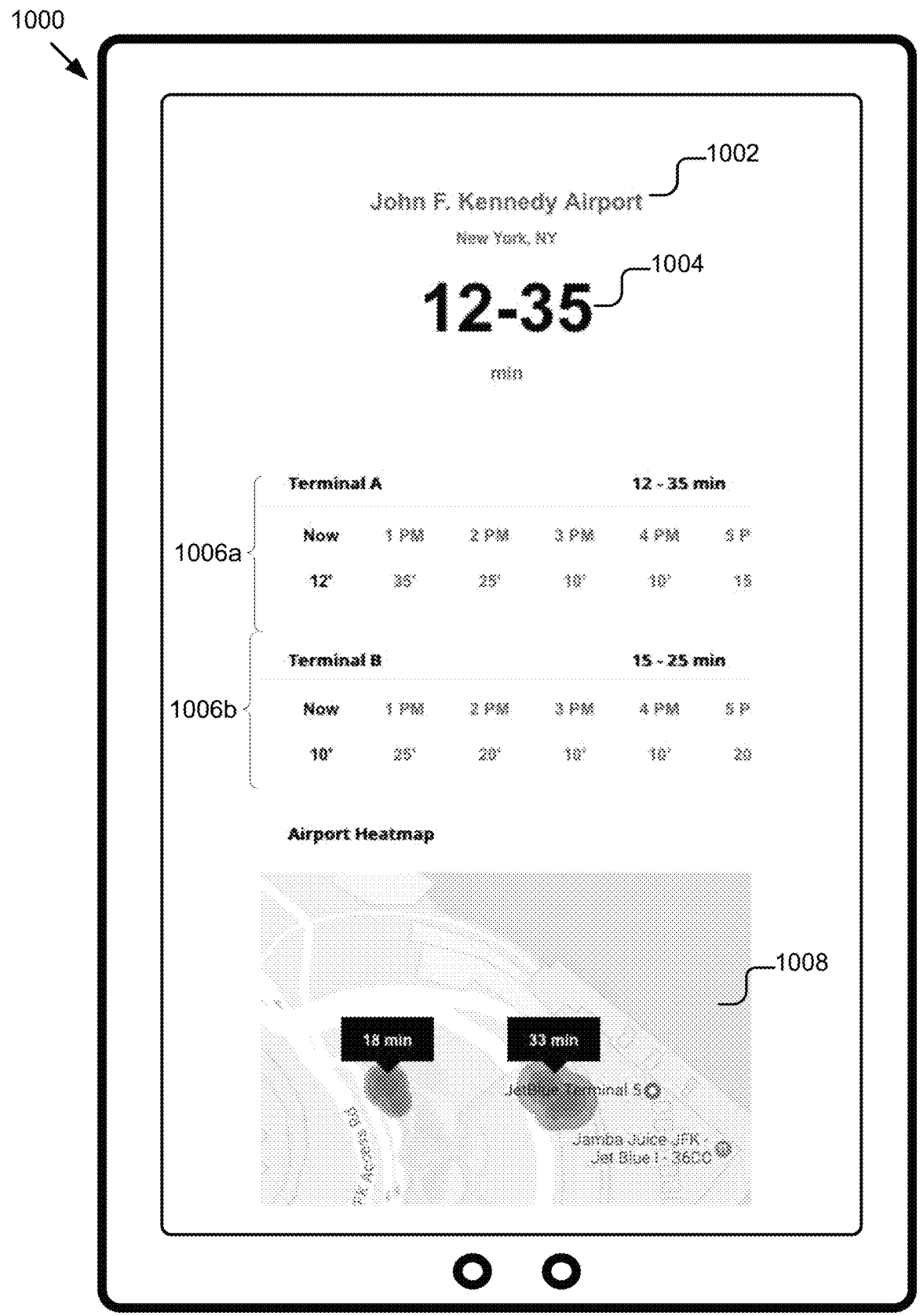
FIG. 10 is a graphical representation of an example graphical user interface (GUI) on a computing device.

FIG. 10 is a graphical representation 1000 of an example graphical user interface (GUI) on a computing device 101. The example GUI allows a user to select a location 1002 and provides an estimated travel time 1004 to the location. The estimated travel time 1004 may be provided by third party sources that can determine travel time between two locations, such as mapping programs, etc. In further implementations, the estimated travel time 1004 may be provided in real-time, using the techniques described elsewhere herein. Various location wait-times 1006 may be shown for different locations. The location wait-times 1006 may depict how wait-times change over different times based on historical data and/or updated real-time information. A heat map 1008 depicting the various wait-times may be shown as described elsewhere herein. The location 1002 in this example is an airport, however other locations are contemplated, including ferry terminals, bus routes and locations, buildings including public buildings that have lines or wait-times within, amusement parks and other tourist attractions, stadiums, etc. This GUI 1000 allows a user to select a destination and using the heat map (as depicted by 1008 in the example) to see both in real-time and/or historic data of average wait-times at various points within the location.

Figure 11:
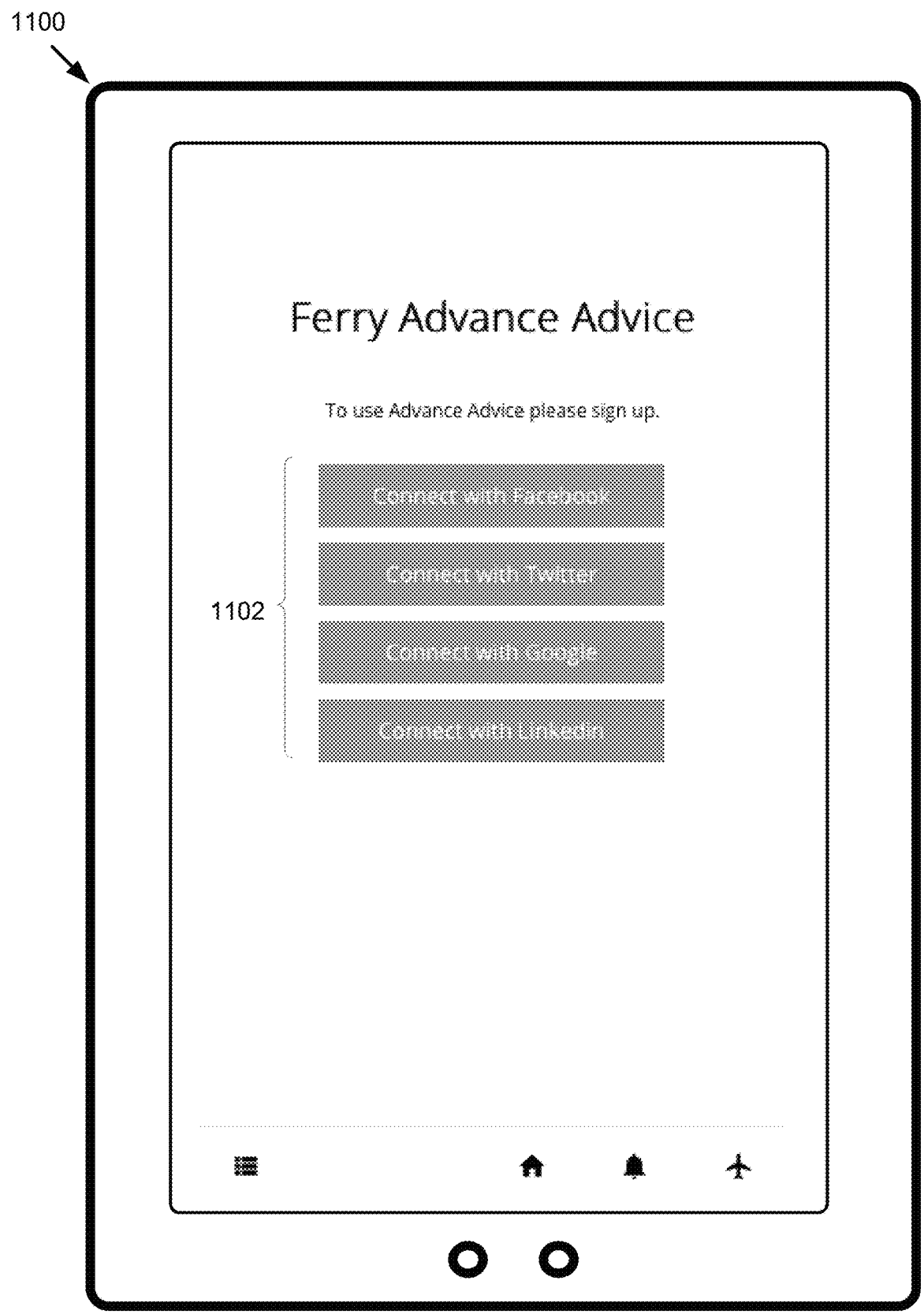
FIG. 11 is a graphical representation of an example connection menu GUI on a computing device.

FIG. 11 is a graphical representation 1100 of an example connection menu GUI on a computing device 101. The example connection menu 1102 shown provides various examples for a user to connect to the mapping server 103. For example, a user may connect with a regular login specific to the mapping server 103. In further implementations, a user may connect using various social media connections (e.g., Facebook, Twitter, Google, Linkedin, etc.) and the mapping server 103 may receive and validate the social media login credentials before allowing the user to be logged into the mapping server 103.

Figure 12:
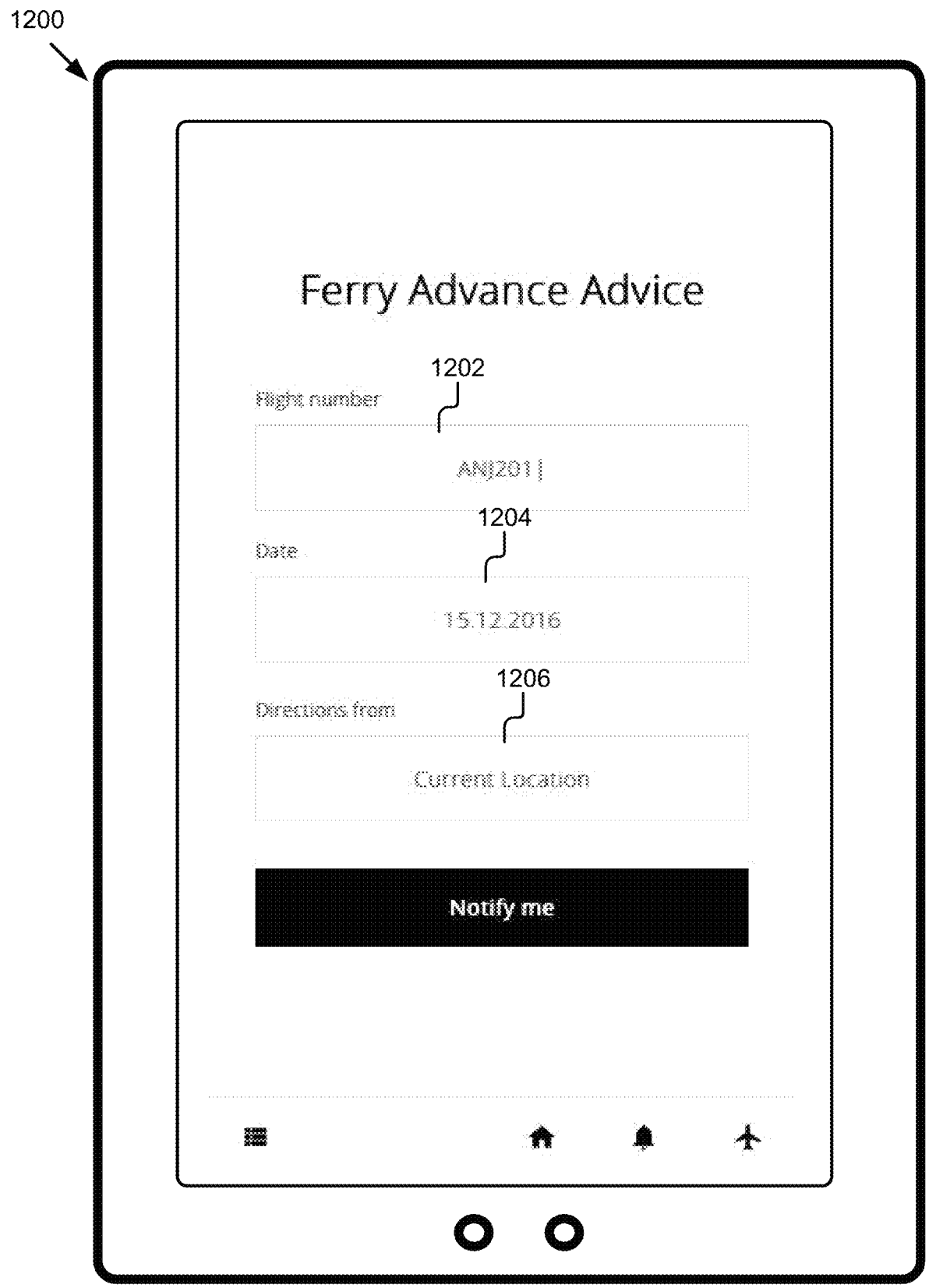
FIG. 12 is a graphical representation of an example route menu GUI on a computing device.

FIG. 12 is a graphical representation 1200 of an example route menu GUI on a computing device 101. The route menu may include options to determine a route to a location. The selectable options may include an identifying entry 1202, such as a flight number, bus route, ride name, museum exhibit name, or other identifying description that allows the mapping server 103 to access a database of locations and retrieve a map related to the identifying entry. The route menu may also include a date section 1204 allowing a user to access a current date or a future date to see historically what an average wait-time or route time would be for the selected date. The route menu may further include a starting point entry 1206 allowing a user to select where directions will begin.

Figure 13:
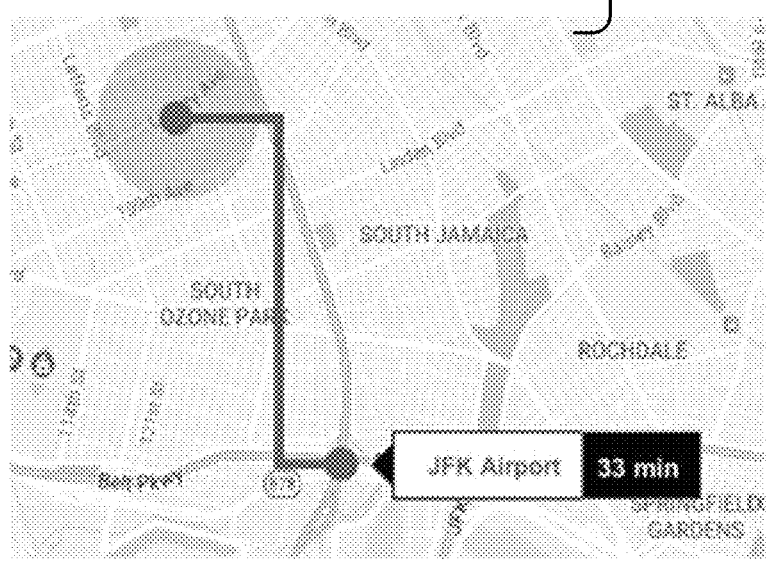
FIG. 13 is a graphical representation of an example route description GUI on a computing device.

FIG. 13 is a graphical representation 1300 of an example route description GUI on a computing device 101. The example route description may include a leave time 1302 that indicates the estimated wait-times in real-time between a starting point and a location. The route description may also include a route map 1304 that shows the suggested route to the location. In some implementations, the route map 1304 may show various routes based on real-time information on wait-times and user may be able to select an alternate route that is different from the generally provided quickest route but would not be as quick based on real-time updates to the wait-time. For example, the route could be impeded by an accident that is shown based on location points of other computing devices 101 at the accident and an alternate route may be suggested that avoids the congestion. Alternatively, in another example, the route may be to a different amusement park ride, but the route may avoid traveling through a common walking area to get to the ride because of a parade causing congestion along the common walking area.

Figure 14:
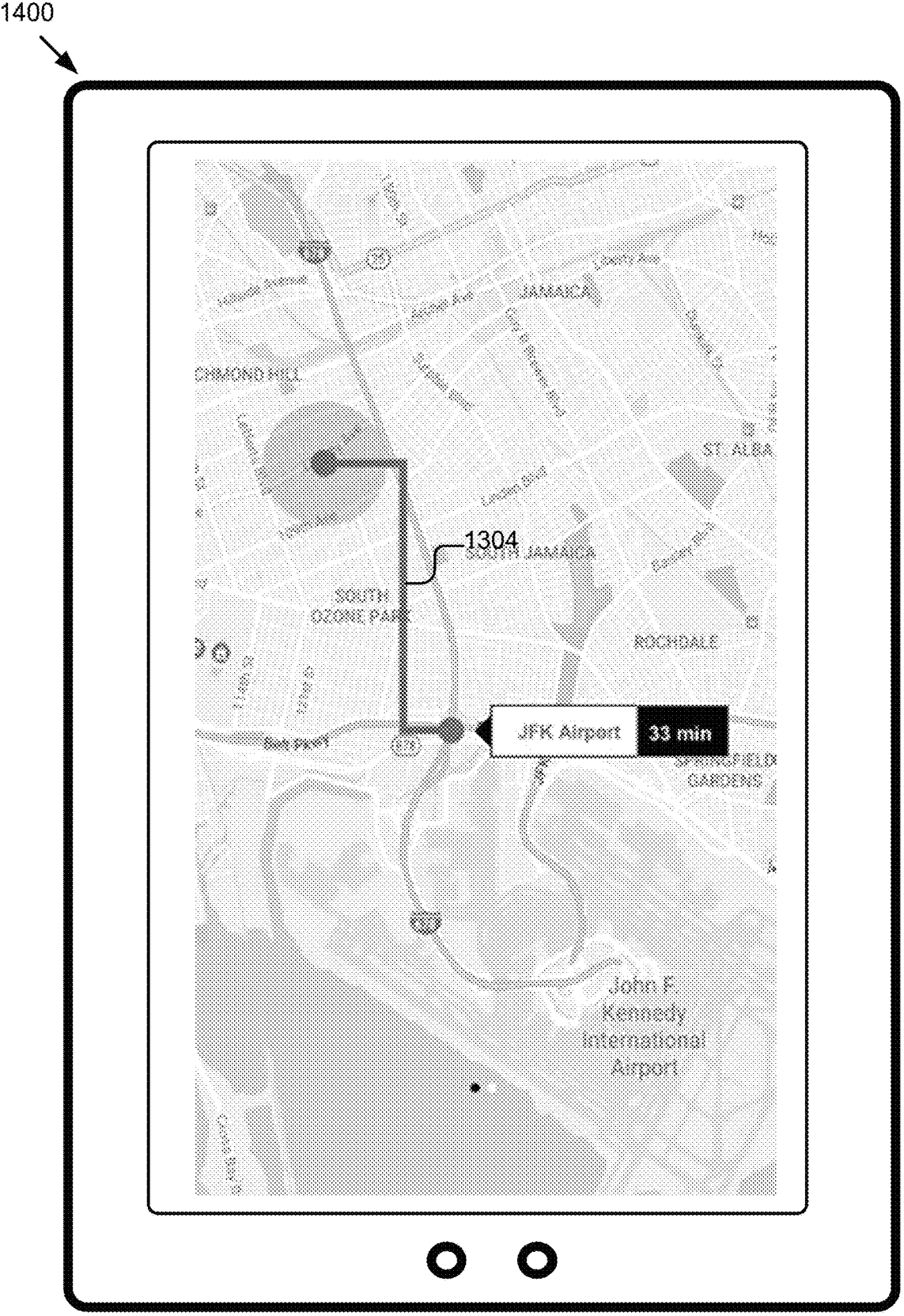
FIG. 14 is a graphical representation of an example route map GUI on a computing device.

FIG. 14 is a graphical representation 1400 of a route map GUI on a computing device 101. The route map 1304 depicted in FIG. 14 may be selectable by a user of the computing device 101 to allow the route map 1304 to display larger on the screen. In some implementations, the route map 1304 may be interactable, allowing a user to select various points of the route map 1304 as well as view and edit the route shown.

Figure 15:
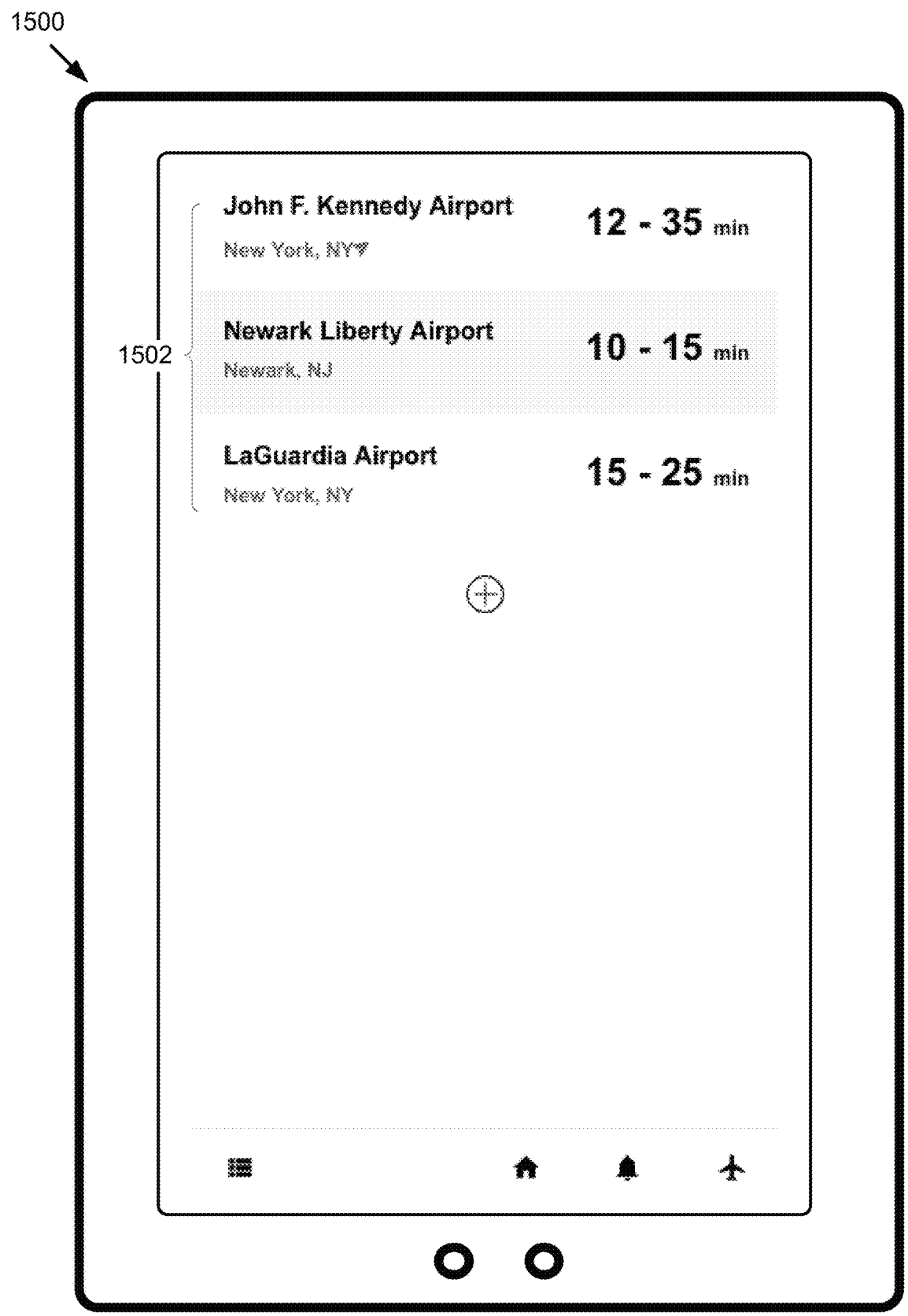
FIG. 15 is a graphical representation of a destination list GUI on a computing device.

FIG. 15 is a graphical representation 1500 of a destination list GUI on a computing device 101. The destination list 1502 may allow a user to input various destinations that may accessible from a menu. In some implementations, a user can input a specific amount of destinations, while in further implementations; a user can input as many destinations as desired. The destinations may represent tracking areas and as a computing device 101 detects that it is within a tracking area of an input destination, the computing device 101 may begin sending location points to the mapping server 103.

This technology yields numerous advantages including, but not limited to, providing real-time updates specific to a user of a computing device 101 related to changes or densities in location data in an area. This allows a user to more efficiently manage time by knowing how long it will take to move around an area and where congestion or slower flows of traffic may be present in real-time. By using the historical data over time combined with the real-time location data, the mapping server 103 is able to continuously provide greater levels of detail and suggestion regarding location determinations and suggested routes. The information may be valuable for managing officials, such as city officials, police departments, transit services, etc. to identify large groups of users and the overall flow and movement of users.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
receiving, using a processor of a server device, current location data from a first computing device in real-time;
mapping, using the processor of the server device, the current location data in a mapping area that includes collected location data from a second computing device, the collected location data including timestamps and location coordinates;
generating, using the processor of the server device, a real-time heat map based on the current location data and the timestamps and the location coordinates of the collected location data;
determining, using the processor of the server device, a line segment on a first grid section of a geohash layer of the mapping area by identifying a density of a cluster of a portion of the collected location data that satisfies a density threshold compared to a neighboring grid section using the generated real-time heat map;
determining, using the processor of the server device, a route suggestion based on the determined line segment;
generating, using the processor of the server device, a visualization of the route suggestion based on the determined line segment; and
providing, using the processor of the server device, the visualization of the route suggestion to the first computing device and causing the first computing device to display the visualization of the route suggestion in a graphical user interface.

2. The method of claim 1, wherein mapping the current location data in the mapping area further comprises:
determining that the current location data satisfies a threshold accuracy; and
mapping the current location data in the map in response to the current location data satisfying the threshold accuracy.

3. The method of claim 1, wherein mapping the current location data in the mapping area further comprises:
mapping the current location data into the geohash layer overlaying the mapping area, the geohash layer including a plurality of grid sections.

4. The method of claim 3, wherein determining the line segment on the first grid section of the geohash layer of the mapping area further comprises:
decoding a portion of the plurality of the grid sections into coordinate data;
associating the coordinate data with an area of interest;
labeling the first grid section as a grid section of interest based on the coordinate data being associated with the area of interest;
comparing a current timestamp associated with the current location data to a neighboring timestamp of the timestamps associated with previously collected location data in the neighboring grid section;
determining that the neighboring timestamp of the neighboring grid section satisfies a threshold time period; and
labeling the grid section of interest and the neighboring grid section as forming a portion of the line segment responsive to the determination that the neighboring timestamp satisfies the threshold time period.

5. The method of claim 3, wherein determining the line segment further comprises:
determining a density of a grid section, the density being related to a quantity of location points from separate computing devices collected over a time period;
comparing the density of the grid section to previously determined densities of adjacent grid sections; and
updating the line segment to include the adjacent grid sections that include previously determined densities that satisfy the density threshold.

6. The method of claim 5, wherein the route suggestion is a wait-time for the determined line segment.

7. The method of claim 6, wherein the wait-time is determined by comparing the line segment including the grid section and adjacent grid sections that satisfy the density threshold to historical data of similar densities of grid sections and estimated times to move through similar densities.

8. The method of claim 1, wherein receiving the current location data from the first computing device further comprises:
detecting that the first computing device has entered a tracking area; and
in response to detecting that the first computing device has entered the tracking area, receiving the current location data from the first computing device.

9. A system comprising:
a processor of a server device; and
a memory storing instructions that, when executed, cause the system to perform instructions including:
receiving current location data from a first computing device in real-time;
mapping the current location data in a mapping area that includes collected location data from a second computing device, the collected location data including timestamps and location coordinates;
generating a real-time heat map based on the current location data and the timestamps and the location coordinates of the collected location data;
determining a line segment on a first grid section of a geohash layer of the mapping area by identifying a density of a cluster of a portion of the collected location data that satisfies a density threshold compared to a neighboring grid section using the generated real-time heat map;
determining a route suggestion based on the determined line segment;
generating a visualization of the route suggestion based on the determined line segment; and
providing the visualization of the route suggestion to the first computing device and causing the first computing device to display the visualization of the route suggestion in a graphical user interface.

10. The system of claim 9, wherein mapping the current location data in the mapping area further comprises:
determining that the current location data satisfies a threshold accuracy; and
mapping the current location data in the mapping area in response to the current location data satisfying the threshold accuracy.

11. The system of claim 9, wherein mapping the current location data in the map further comprises:
mapping the current location data into the geohash layer overlaying the map, the geohash layer including a plurality of grid sections.

12. The system of claim 11, wherein determining the line segment on the first grid section of the geohash layer of the mapping area using the generated real-time heat map further comprises:
- decoding a portion of the plurality of the grid sections into coordinate data;
- associating the coordinate data with an area of interest;
- labeling the first grid section as a grid section of interest based on the coordinate data being associated with the area of interest;
- comparing a current timestamp associated with the current location data to a neighboring timestamp of the timestamps associated with previously collected location data in the neighboring grid section;
- determining that the neighboring timestamp of the neighboring grid section satisfies a threshold time period; and
- labeling the grid section of interest and the neighboring grid section as forming a portion of the line segment responsive to the determination that the neighboring timestamp satisfies the threshold time period.

13. The system of claim 11, wherein determining the line segment further comprises:
- determining a density of a grid section, the density being related to a quantity of location points from separate computing devices collected over a time period;
- comparing the density of the grid section to previously determined densities of adjacent grid sections; and
- updating the line segment to include the adjacent grid sections that include previously determined densities that satisfy the density threshold.

14. The system of claim 13, wherein the route suggestion is a wait-time for the determined line segment.

15. The system of claim 14, wherein the wait-time is determined by comparing the line segment including the grid section and adjacent grid sections that satisfy the density threshold to historical data of similar densities of grid sections and estimated times to move through similar densities.

16. The system of claim 9, wherein receiving the current location data from the first computing device further comprises:
- detecting that the first computing device has entered a tracking area; and
- in response to detecting that the first computing device has entered the tracking area, receiving the current location data from the first computing device.

17. A method comprising:
- detecting, using a processor of a computing device, that the computing device has entered into a tracking area and beginning a session related to the computing device;
- receiving, using the processor of the computing device, a plurality of location points related to locations of the computing device at time intervals;
- determining, using the processor of the computing device, an accuracy of each of the plurality of location points and storing location points that satisfy a threshold accuracy;
- aggregating, using the processor of the computing device, the plurality of the stored location points by mapping the plurality of the stored location points into a grid including grid sections;
- clustering, using the processor of the computing device, the location points in each of the grid sections;
- decoding, using the processor of the computing device, a portion of the grid sections into coordinate data and labeling one of the grid sections that corresponds to an area of interest within the tracking area as a grid section of interest;
- comparing, using the processor of the computing device, a timestamp of a location point in the grid section of interest to a timestamp of a neighboring location point in a neighboring grid section;
- determining, using the processor of the computing device, that the comparison satisfies a threshold time period;
- aggregating, using the processor of the computing device, the neighboring grid section and the grid section of interest and labeling the aggregated sections as a line;
- determining, using the processor of the computing device, a wait-time for the section based on the line;
- generating, using the processor of the computing device, a visualization of the wait time for the section; and
- presenting the visualization of the wait-time for the section in a graphical user interface on the computing device.

18. The method of claim 17, further comprising:
- determining, using the processor of the computing device, a route through the tracking area based on the line.

19. The method of claim 18, wherein determining the route through the tracking area based on the line further comprises:
- identifying, using the processor of the computing device, a bottleneck where a density of location points satisfies a bottleneck threshold; and
- identifying, using the processor of the computing device, a throughput where a density of location point indicates a flow.

20. The method of claim 17, wherein clustering the location points further comprises:
- aggregating, using the processor of the computing device, the location points in each of the grid sections; and
- assigning, using the processor of the computing device, a density value to each of the grid sections based on the aggregated location points.

* * * * *